United States Patent
Blinick et al.

(10) Patent No.: US 9,036,287 B2
(45) Date of Patent: *May 19, 2015

(54) ADAPTIVE SOFT-OUTPUT DETECTOR FOR MAGNETIC TAPE READ CHANNELS

(71) Applicant: International Business Machines Corporation, Armonk, NY (US)

(72) Inventors: Katherine T. Blinick, Tucson, AZ (US); Robert A. Hutchins, Tucson, AZ (US); Thomas Mittelholzer, Zurich (CH); Sedat Oelcer, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/253,705

(22) Filed: Apr. 15, 2014

(65) Prior Publication Data
US 2014/0226230 A1    Aug. 14, 2014

Related U.S. Application Data

(63) Continuation of application No. 13/527,473, filed on Jun. 19, 2012, now Pat. No. 8,743,498.

(51) Int. Cl.
*G11B 5/035* (2006.01)
*G11B 20/10* (2006.01)
*G11B 5/008* (2006.01)

(52) U.S. Cl.
CPC .......... *G11B 20/10046* (2013.01); *G11B 5/008* (2013.01); *G11B 20/10268* (2013.01)

(58) Field of Classification Search
None
See application file for complete search history.

(56) References Cited

U.S. PATENT DOCUMENTS

| 6,460,150 | B1 | 10/2002 | Cideciyan et al. |
| 6,625,235 | B1 | 9/2003 | Coker et al. |
| 7,383,484 | B2 | 6/2008 | Yeh et al. |

(Continued)

FOREIGN PATENT DOCUMENTS

| EP | 1267345 | 12/2002 |
| JP | 2002367291 | 12/2002 |

OTHER PUBLICATIONS

International Search Report and Written Opinion from PCT Application No. PCT/IB2013/054129 dated Aug. 20, 2013.

(Continued)

*Primary Examiner* — Thang Tran
(74) *Attorney, Agent, or Firm* — Zilka-Kotab, PC

(57) ABSTRACT

In one embodiment, a method includes passing a signal through a noise whitening filter, passing the signal through a soft detector to calculate first soft information, passing the signal through the soft decoder to calculate second soft information based on the first soft information, and sending the second soft information to the soft detector, wherein the noise whitening filter is configured to process the signal according to the following transfer polynomial: $W(D)=1-(p_1 D+ \ldots p_\lambda D^\lambda)$, where $p_1 \ldots p_\lambda$ are noise whitening coefficients, D is delay corresponding to bit duration, and a transfer polynomial of the tape channel is $F(D)=1+f_1 D+ \ldots +f_L D^L$, wherein L represents a memory length of the tape channel, and wherein $\lambda$ represents a memory length of the noise whitening filter. Other methods, systems, and computer program products are described in more embodiments.

20 Claims, 14 Drawing Sheets

(56) References Cited

U.S. PATENT DOCUMENTS

| | | | |
|---|---|---|---|
| 7,522,367 | B2 | 4/2009 | Eleftheriou et al. |
| 7,864,467 | B2 | 1/2011 | Eleftheriou et al. |
| 8,077,764 | B2 | 12/2011 | Eleftheriou et al. |
| 8,743,498 | B2 | 6/2014 | Blinick et al. |
| 8,743,499 | B2 | 6/2014 | Blinick et al. |
| 8,743,500 | B2 | 6/2014 | Blinick et al. |
| 8,797,670 | B2 | 8/2014 | Blinick et al. |
| 2002/0154712 | A1 | 10/2002 | Cideciyan et al. |
| 2003/0026028 | A1 | 2/2003 | Ichihara et al. |
| 2003/0138035 | A1 | 7/2003 | Mills |
| 2005/0018794 | A1 | 1/2005 | Tang et al. |
| 2005/0097423 | A1 | 5/2005 | Mills |
| 2006/0156171 | A1 | 7/2006 | Kuznetsov et al. |
| 2007/0055919 | A1 | 3/2007 | Li et al. |
| 2007/0192666 | A1* | 8/2007 | Song et al. ............... 714/780 |
| 2007/0283220 | A1 | 12/2007 | Kim |
| 2008/0115036 | A1 | 5/2008 | Kuznetsov et al. |
| 2009/0015446 | A1 | 1/2009 | Coene et al. |
| 2009/0115647 | A1 | 5/2009 | Mittelholzer |
| 2009/0235116 | A1 | 9/2009 | Tan et al. |
| 2009/0235142 | A1 | 9/2009 | Galbraith et al. |
| 2009/0235146 | A1 | 9/2009 | Tan et al. |
| 2009/0268575 | A1 | 10/2009 | Tan et al. |
| 2009/0268848 | A1* | 10/2009 | Tan et al. ............... 375/316 |
| 2009/0273492 | A1* | 11/2009 | Yang et al. ............... 341/81 |
| 2010/0061490 | A1 | 3/2010 | Noeldner |
| 2010/0189169 | A1 | 7/2010 | Eleftheriou et al. |
| 2010/0229031 | A1 | 9/2010 | Tan et al. |
| 2011/0107187 | A1 | 5/2011 | Gill et al. |
| 2011/0167246 | A1 | 7/2011 | Yang et al. |
| 2011/0242692 | A1 | 10/2011 | Blinick et al. |
| 2011/0246864 | A1 | 10/2011 | Eleftheriou et al. |
| 2012/0033320 | A1* | 2/2012 | Tan et al. ............... 360/39 |
| 2012/0207201 | A1 | 8/2012 | Xia et al. |
| 2012/0265488 | A1 | 10/2012 | Sun et al. |
| 2013/0054664 | A1 | 2/2013 | Chang et al. |
| 2013/0067297 | A1 | 3/2013 | Yang et al. |
| 2013/0077186 | A1 | 3/2013 | Xia et al. |
| 2013/0279040 | A1* | 10/2013 | Cideciyan et al. ............... 360/53 |
| 2013/0335845 | A1 | 12/2013 | Blinick et al. |
| 2013/0335846 | A1 | 12/2013 | Blinick et al. |
| 2013/0335848 | A1 | 12/2013 | Blinick et al. |
| 2013/0335849 | A1 | 12/2013 | Blinick et al. |
| 2014/0226231 | A1 | 8/2014 | Blinick |
| 2014/0226232 | A1 | 8/2014 | Blinick |

OTHER PUBLICATIONS

Mittelholzer et al., "Reduced-Complexity Decoding of Low Density Parity Check Codes for Generalized Partial Response Channels," 2001 IEEE, IEEE Transactions on Magnetics, vol. 37, No. 2, Mar. 2001, pp. 721-728.

Chesnutt, E., "Novel Turbo Equalization Methods for the Magnetic Recording Channel," 2005 Elizabeth Chesnutt, Georgia Institute of Technology, May 2005, 116 pgs.

Viterbi, A., "An Intuitive Justification and a Simplified Implementation of the MAP Decoder for Convolutional Codes," 1998 IEEE, IEEE Journal on Selected Areas in Communications, vol. 16, No. 2, Feb. 1998, pp. 260-264.

Bahl et al., "Optimal Decoding of Linear Codes for Minimizing Symbol Error Rate," IEEE Transactions on Information Theory, Mar. 1974, pp. 284-287.

Robertson et al., "Optimal and Sub-Optimal Maximum A Posteriori Algorithms Suitable for Turbo Decoding," Sep. 12, 2008, pp. 1-16.

Blinick et al., U.S. Appl. No. 13/527,508 filed on Jun. 19, 2012.

Non-Final Office Action from U.S. Appl. No. 13/527,508 dated Nov. 7, 2013.

Notice of Allowance and Fee(s) Due from U.S. Appl. No. 13/527,508 dated Mar. 7, 2014.

Blinick et al., U.S. Appl. No. 13/527,501 filed on Jun. 19, 2012.

Non-Final Office Action from U.S. Appl. No. 13/527,501 dated Oct. 10, 2013.

Notice of Allowance and Fee(s) Due from U.S. Appl. No. 13/527,501 dated Jan. 17, 2014.

Blinick et al., U.S. Appl. No. 13/527,490 filed on Jun. 19, 2012.

Non-Final Office Action from U.S. Appl. No. 13/527,490 dated Oct. 23, 2013.

Notice of Allowance and Fee(s) Due from U.S. Appl. No. 13/527,490 dated Jan. 17, 2014.

Blinick et al., U.S. Appl. No. 13/527,473 filed on Jun. 19, 2012.

Non-Final Office Action from U.S. Appl. No. 13/527,473 dated Sep. 26, 2013.

Notice of Allowance and Fee(s) Due from application no. 13/527,473 dated Jan. 24, 2014.

Non-Final Office Action from U.S. Appl. No. 14/253,737 dated Jul. 18, 2014.

Non-Final Office Action from U.S. Appl. No. 14/253,724 dated Jul. 18, 2014.

Final Office Action from U.S. Appl. No. 14/253,724 dated Nov. 3, 2014.

Final Office Action from U.S. Appl. No. 14/253,737 dated Nov. 3, 2014.

Notice of Allowance from U.S. Appl. No. 14/253,724, dated Jan. 20, 2015.

Notice of Allowance from U.S. Appl. No. 14/253,737, dated Jan. 21, 2015.

* cited by examiner

ADAPTIVE SOFT-OUTPUT DETECTOR FOR MAGNETIC TAPE READ CHANNELS

RELATED APPLICATIONS

This application is a continuation of copending U.S. patent application Ser. No. 13/527,473, filed Jun. 19, 2012, which is herein incorporated by reference.

BACKGROUND

The present invention elates to data storage using magnetic tape channels, and more particularly, to reading data using an adaptive soft-output detector in the magnetic tape read channels.

A conventional data flow 200 for reading data from a magnetic tape is shown in FIG. 2, according to the prior art. The tape channel 202 receives data that has passed through an error correction code (ECC) encoder and a modulation code (MC) encoder prior to being stored to magnetic tape. Then, the tape channel 202 reads the data as signal $x_k$, to which noise $n_k$ is injected yielding a signal $y_k$ that is read by the hard detector 204. This detection utilizes a hard detector 204, which does not incorporate soft information in its detecting scheme.

Soft information may be considered a probability that a detected bit (0 or 1) is actually a 0 or a 1. There are different measures of probability that may be implemented in a data flow, but any data flow which uses probabilities (soft information) for decoding must rely on soft detection. However, soft detection in magnetic tape recording channels have typically suffered from some problems. Two types of soft detection typically used are BCJR, which is named after its inventors, Bali, Cocke, Jelinek, and Raviv, and DualMax, which is a derivative (simplified version) of BOR. that relies on an assumption.

However, each of these algorithms experience issues when implemented in data flows for magnetic tape recording channels. Accordingly, it would be beneficial to have a soft detector that is capable of operating in magnetic tape recording channel data flow that alleviates the issues associated with known algorithms.

BRIEF SUMMARY

In one embodiment, a data storage system includes a tape channel for eading data from a magnetic tape medium to produce a signal, a noise whitening fate positioned subsequent to the tape channel configured to receive the signal, wherein the noise whitening filter is configured to minimize variance of its output signal, a soft detector configured to receive output from the noise whitening filter, the soft detector configured to calculate first soft information about each bit of the signal and sending the first soft information to a soft decoder, and the soft decoder positioned subsequent to the soft detector, the soft decoder being configured to calculate second soft information about each bit of the signal and sending the second soft information to the soft detector, wherein the soft detector applies a Dual-MAX (DMAX) algorithm, including:

$$\alpha_k(S_k) \cong \max_{S_{k-1}} \{\gamma_k(S_{k-1}, S_k) + \alpha_{k-1}(S_{k-1})\}$$

$$\beta_{k-1}(S_{k-1}) \cong \max_{S_k} \{\gamma_k(S_{k-1}, S_k) + \beta_k(S_k)\}$$

-continued $$LLR(a_k) \cong \max_{\substack{S_{k-1} \to S_k \\ a_k = +1}} \{\alpha_{k-1}(S_{k-1}) + \gamma_k(S_{k-1}, S_k) + \beta_k(S_k)\} - \max_{\substack{S_{k-1} \to S_k \\ a_k = -1}} \{\alpha_{k-1}(S_{k-1}) + \gamma_k(S_{k-1}, S_k) + \beta_k(S_k)\},$$

wherein $y_k$ is the signal, $a_k$ denotes a bit in a bit sequence of the signal, $a_k(S_k)$ is an alpha term for a current state $(S_k)$ in a forward recursion, $a_k(S_{k-1})$ is an alpha term for a previous state $(S_{k-1})$ in the forward recursion $\beta_k(S_k)$ is a beta term for the current state in a backward recursion, $\beta_{k-1}(S_{k-1})$ is a beta term for the previous state in the backward recursion, and $LLR(a_k)$ is an approximation of a log-likelihood term that calculates a posteriori probabilities.

In another embodiment, a method includes reading data from a magnetic tape medium using a tape channel to produce a signal, passing the signal through a noise whitening filter to minimize variance of the signal output from the noise whitening filter, passing the signal through a soft detector to calculate first soft information about each bit of the signal, sending the first soft information to a soft decoder, passing the signal through the soft decoder to calculate second soft information about each bit of the signal, and sending the second soft information to the soft detector, wherein the noise whitening filter is configured to process the signal according to the following transfer polynomial: $W(D)=1-(p_1D+ \ldots +p_\lambda D^\lambda)$, where $p_1 \ldots p_\lambda$ are noise whitening coefficients with the noise whitening filter having $2^\lambda$ states, where D is delay that corresponds to bit duration and where a transfer polynomial of the tape channel is $F(D)=1+f_LD^L$ with the tape channel having $2^L$ states, wherein L represents a memory length of the tape channel, and wherein $\lambda$ represents a memory length of the noise whitening filter.

In yet another embodiment, a computer program product includes a computer readable storage medium having computer readable program code embodied therewith, the computer readable program code being readable/executable by a processor to cause the processor to pass, by the processor, a signal through a noise whitening filter to minimize noise variance of the signal output from the noise whitening filter, the signal including data read from a magnetic tape medium, pass, by the processor, the signal through a soft detector to calculate first soft information about each bit of the signal, and send, by the processor, second soft information about each bit of the signal calculated in a soft decoder to the soft detector, wherein the soft detector applies a DMAX algorithm, and herein the noise whitening filter is configured to process the signal according to the following transfer polynomial: $W(D)=1-(p_1D+\ldots+p_\lambda D^\lambda)$, where $p_1 \ldots p_\lambda$ are noise whitening coefficients, where D is delay corresponding to bit duration and where the tape channel transfer polynomial is characterized by $F(D)=1+f_1D+ \ldots +f_LD^L$, with $2^L$ being a number of states of the tape channel, wherein the soft detector has a total of $2^{L+\lambda}$ states, the noise whitening filter comprises $2^\lambda$ states, and $\lambda'$ is greater than wherein L represents a memo length of the tape channel, and wherein $\lambda$ represents a. memory length of the noise whitening filter.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed descrip-

DETAILED DESCRIPTION

Figure 1:
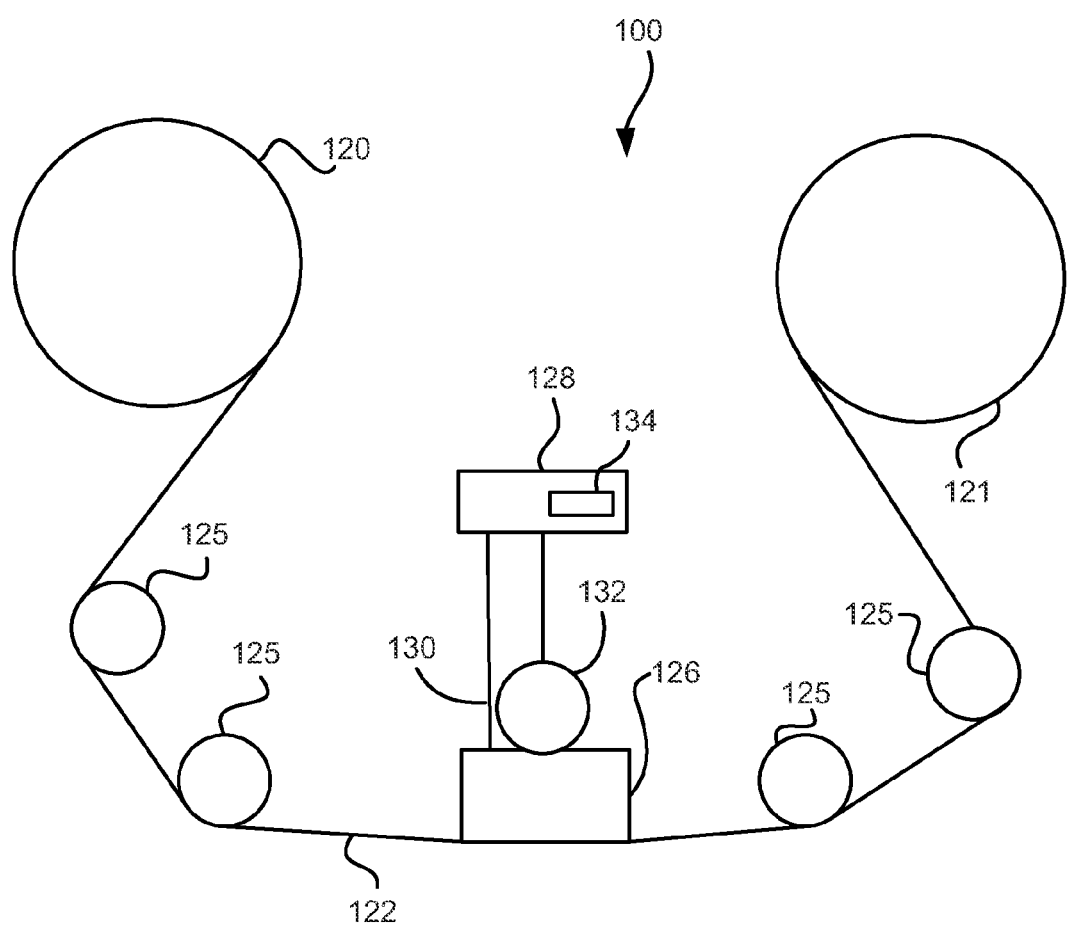
FIG. 1 illustrates a simplified tape drive of a tape-based data storage system, according to one embodiment.
Figure 2:
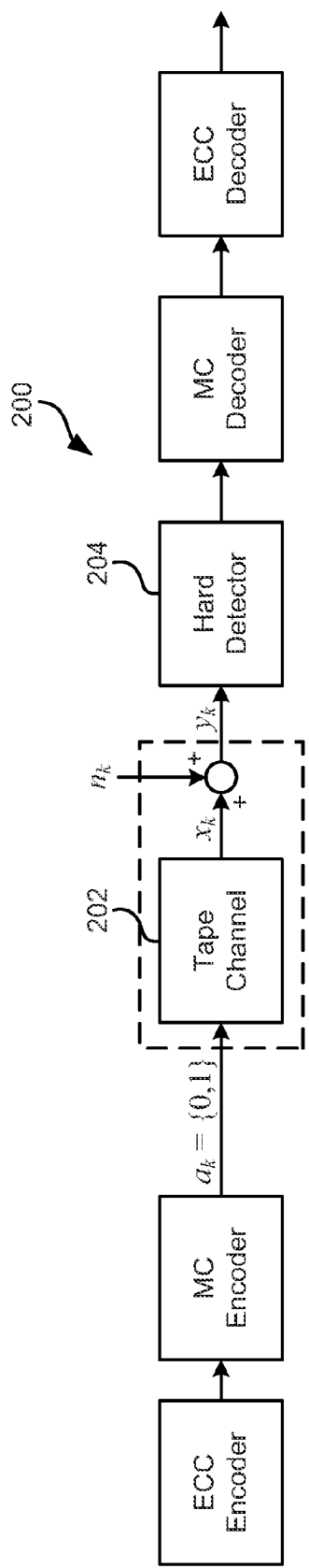
FIG. 2 shows a data flow for a magnetic tape recording channel, according to the prior art.

The following, description is made for the purpose of illustrating, the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a data storage system includes a tape channel for reading data from a magnetic tape medium to produce a signal, a noise whitening filter positioned subsequent to the tape channel adapted for receiving the signal, wherein the noise whitening filter is adapted for minimizing variance of its output signal, a soft detector adapted for receiving output from the noise whitening filter, the soft detector adapted for calculating first soft information about each bit of the signal and sending the first soft information to a soft decoder, and the soft decoder positioned subsequent to the soft detector, the soft decoder being adapted for calculating second soft information about each bit of the signal and sending the second soft information to the soft detector.

In another general embodiment, a method includes reading data from a. magnaic tape medium using a tape channel to produce a signal, passing the signal through a noise whitening filter to minimize variance of the signal output from the noise whitening filter, passing the signal through a soft detector to calculate first soft information about each bit of the signal, sending the first soft information to a soft. decoder, passing the signal through the soft decoder to calculate second soft information about each bit of the signal, and sending the second soft information to the soft detector.

In yet another general embodiment, a computer program product includes a computer readable storage medium having computer readable program code embodied therewith, the computer readable program code including computer readable program code configured for reading data from a magnetic tape medium using a tape channel to produce a signal, computer readable program code configured for passing the signal through a noise whitening filter to minimize noise variance of the signal output from the noise whitening filter, computer readable program code configured for passing the signal through a. soft detector to calculate first soft information about each)fthe computer readable program code configured for sending the first soft information to a soft decoder, computer readable program code configured for passing the signal through the soft decoder to calculate second soft information about each bit of the signal, and computer readable program code configured for sending the second soft information to the soft detector.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," a "module," or a "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. in the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can collartli ticate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming image such as Java, Smalltalk, C or the like and conventional procedural programming languages, such as the "C" programming language or similar programming languages. The program code may execute entirety on the user's computer, partly on the user's computer, as a stand-alone software package, partly on the user's computer and partly on a remote computer entirely on the remote computer. or server. In the latter scenario, the remote computer may be connected to the user's computer through any type of network, including a local area network (LAN) or a wide area network (WAN), or the connection may be made to an external computer (for example, through the Inte et using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may he provided to a processor of a general purpose computer, special purpose computer, or other programmable data processing apparatus to produce a machine, such that the instructions, which execute via, the processor of the computer or other programmable data processing apparatus, create means for imp.lkmenting the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a simplified tape drive 100 of a tape-based data storage system, which may be employed according to various embodiments. While one specific implementation of a tape drive is shown in FIG. 1, it should be noted that the bodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type. The tape 122 may be a linear tape open (LTO) format or any other suitable magnetic tape medium known in the art.

Guides 125 guide the tape 122 aeross the tape head 126. Such tape head 126 is in turn coupled to a controller assembly 128 via a ca e 130. The controller 128 typically comprises a servo channel and controls head fUnctions, such as track following, writing, reading, etc. The cable 130 may include read/write circuits to transmit data to the head 126 to be recorded on the tape 122 and to receive data read by the head 126 from the tape 122. An actuator 132 determines position of the head 126 elative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 3:
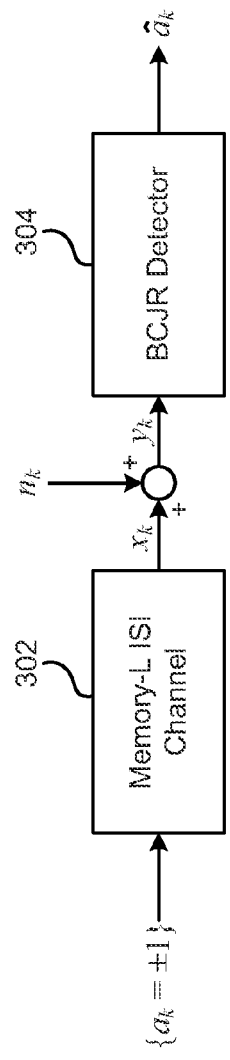
FIG. 3 is a partial data flow for BCJR detection, according to the prior art.

BCJR soft detection relies on the a posteriori probability (APP) of states and state transitions in a channel finite-state machine, and adheres to the flow shown in FIG. 3. The ISI channel 302 is described by a trellis diagram with state $S_k \in \{0, 1, \ldots, 2^L-1\}$ at time k. The joint probability density $p(S_{k-1}, S_k, Y_1^N)$ plays a central role in the algorithm because of the following relationship, where the summation occurs over all trellis branches for which $a_k=+1$ (as shown) and $-1$.

$$P(a_k = +1 \mid Y_1^N) \sim \sum_{\substack{S_{k-1} \to S_k \\ a_k = +1}} p(S_{k-1}, S_k, Y_1^N)$$

The BCJR detector 304 factors a joint probability density as follows, where the first term is computed through forward recursion, the second term is the branch transition probability, and the third term is computed through backward recursion.

$$p(S_{k-1}, S_k, Y_1^N) = p(S_{k-1}, S_k, \overbrace{Y_1^{k-1}, y_k, Y_{k+1}^N}) \\
= p(S_{k-1}, Y_1^{k-1}) \cdot p(y_k, S_k \mid S_{k-1}) \cdot p(Y_{k+1}^N \mid S_k) \\
= \underbrace{p(S_{k-1}, Y_1^{k-1})}_{\alpha_{k-1}(S_{k-1})} \cdot \underbrace{p(y_k \mid S_{k-1}, S_k) \cdot P(S_k \mid S_{k-1})}_{\gamma_k(S_{k-1}, S_k)} \cdot \\
\underbrace{p(Y_{k+1}^N \mid S_k)}_{\beta_k(S_k)}$$

Forward Recrusion:

$$\bar{\alpha}_k(S_k) = \sum_{S_{k-1}} \bar{\gamma}_k(S_{k-1}, S_k) \cdot \bar{\alpha}_{k-1}(S_{k-1})$$

Branch Transition Probability:

$$p(y_k | S_{k-1}, S_k) = \frac{1}{\sqrt{2\pi}\,\sigma} e^{-(y_k - x_k)^2/2\sigma^2}$$

$$P(S_k | S_{k-1}) = P(a_k)$$

Reverse Recursion:

$$\bar{\beta}_{k-1}(S_{k-1}) = \sum_{S_k} \bar{\gamma}_k(S_{k-1}, S_k) \cdot \bar{\beta}_k(S_k)$$

The BCJR algorithm uses a maximum a posteriori (MAP) detection rule, where the binary value $\hat{a}_k$ is selected that yields the larger APP according to either the likelihood ratio (LR) or the log likelihood ratio (LLR), as follows.

$$LR(a_k) = \frac{P(a_k = +1 | Y_1^N)}{P(a_k = -1 | Y_1^N)} \rightarrow \begin{cases} LR(a_k) \geq 1 \Rightarrow \hat{a}_k = +1 \\ LR(a_k) < 1 \Rightarrow \hat{a}_k = -1 \end{cases}$$

$$LLR(a_k) = \ln\frac{P(a_k = +1 | Y_1^N)}{P(a_k = -1 | Y_1^N)} \rightarrow \begin{cases} LLR(a_k) \geq 0 \Rightarrow \hat{a}_k = +1 \\ LLR(a_k) < 0 \Rightarrow \hat{a}_k = -1 \end{cases}$$

The BCJR may be advantageously formulated in the log domain, such that the following relationships are created.

$$\bar{\alpha}_k(S_k) \Longrightarrow \alpha_k(S_k) = \ln[\bar{\alpha}_k(S_k)]$$
$$\bar{\beta}_k(S_k) \Longrightarrow \beta_k(S_k) = \ln[\bar{\beta}_k(S_k)]$$
$$\bar{\gamma}_k(S_{k-1}, S_k) \Longrightarrow \gamma_k(S_{k-1}, S_k) = \ln[\bar{\gamma}_k(S_{k-1}, S_k)]$$
$$p(S_{k-1}, S_k, Y_1^N) = \Longrightarrow p(S_{k-1}, S_k, Y_1^N) =$$
$$\bar{\alpha}_{k-1}(S_{k-1})\bar{\gamma}_k(S_{k-1}, S_k)\bar{\beta}_k(S_k) \quad e^{\alpha_{k-1}(S_{k-1}) + \gamma_k(S_{k-1}, S_k) + \beta_k(S_k)}$$
$$LR(a_k) = \frac{P(a_k = +1 | Y_1^N)}{P(a_k = -1 | Y_1^N)} \Longrightarrow LLR(a_k) = \ln\frac{P(a_k = +1 | Y_1^N)}{P(a_k = -1 | Y_1^N)}$$

Another algorithm that may be used in soil, detection is called a Dual-Max algorithm, which is based on BCJR with some modifications and simplifications. A simplified (sub-optimum) algorithm is obtained based on the following approximation.

$$\ln\left[\sum_i e^{\delta_i}\right] \cong \max_i \delta_i$$

Then, the max-Log-MAP (Dual-Max or DMAX) algorithm may be modeled as follows:

$$\alpha_k(S_k) \cong \max_{S_{k-1}} \{\gamma_k(S_{k-1}, S_k) + \alpha_{k-1}(S_{k-1})\}$$
$$\beta_{k-1}(S_{k-1}) \cong \max_{S_k} \{\gamma_k(S_{k-1}, S_k) + \beta_k(S_k)\}$$

$$LLR(a_k) \cong \max_{\substack{S_{k-1} \rightarrow S_k \\ a_k = +1}} \{\alpha_{k-1}(S_{k-1}) + \gamma_k(S_{k-1}, S_k) + \beta_k(S_k)\} - \max_{\substack{S_{k-1} \rightarrow S_k \\ a_k = -1}} \{\alpha_{k-1}(S_{k-1}) + \gamma_k(S_{k-1}, S_k) + \beta_k(S_k)\},$$

Figure 4:
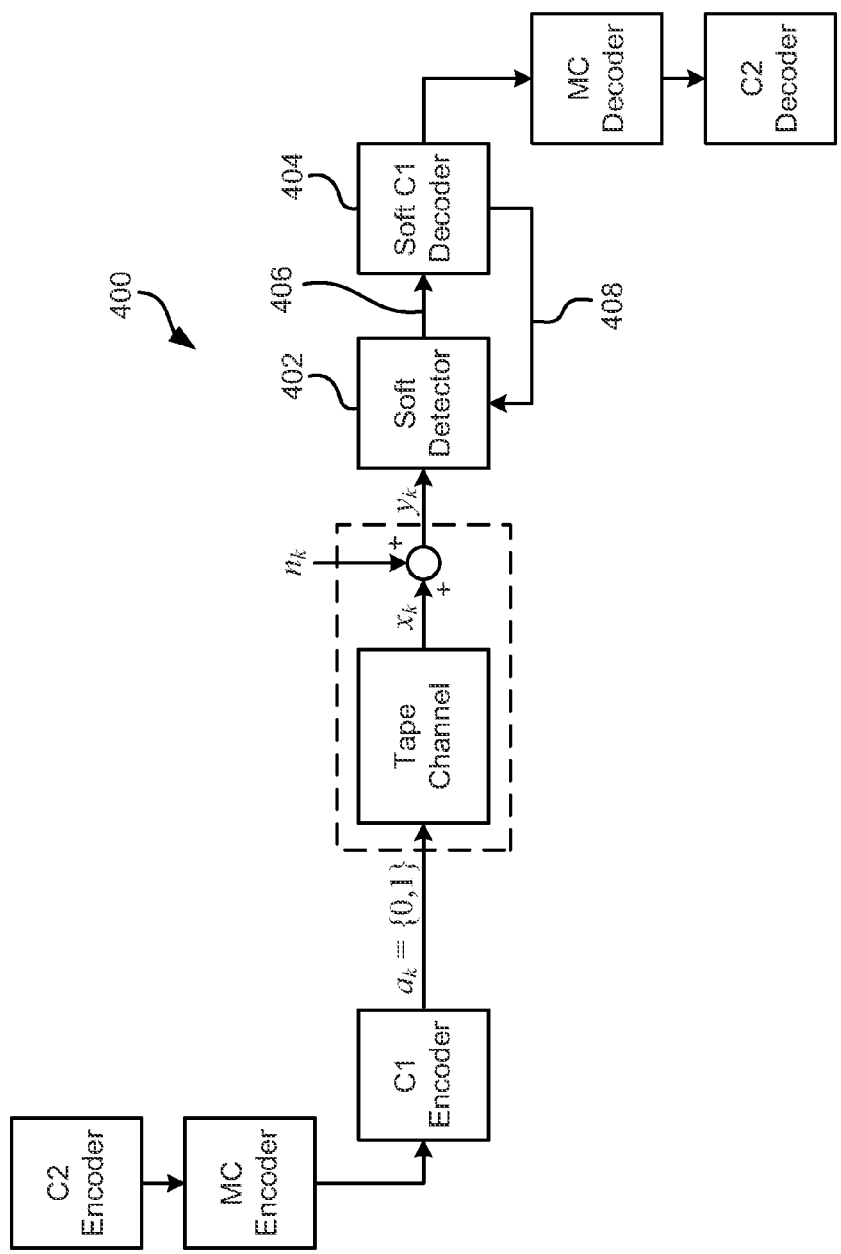
FIG. 4 is a partial reverse concatenation architecture with soft detection and soft decoding, according to one embodiment.

A partial reverse concatenation architecture 400 with soft detection 402 and soft decoding 404 is shown in FIG. 4, according to one embodiment. In this architecture, C2 encoding is performed on data, then MC encoding, and then C1 encoding prior to being written to a magnetic tape medium. Then, in reading data from the tape via the tape channel, signal $x_k$ is read with added noise $n_k$ to yield the signal $y_k$ winch is then sent to the soft detector 402. The soft detector calculates and sends soft information about the bit sequence $\{a_k\}$ 406 to the soft C1 decoder 404. The soft C1 decoder 404 then calculates and sends soft information about the bit sequence $\{a_k\}$ 408 back to the soft detector 402, thereby creating an iterative loop. As the number of iterations increases, so does the detection accuracy of the bits in the bit sequence $\{a_k\}$. In one embodiment, the soft detector 402 may have $2^L$ states, as determined by the number of states of the tape channel.

Figure 5:
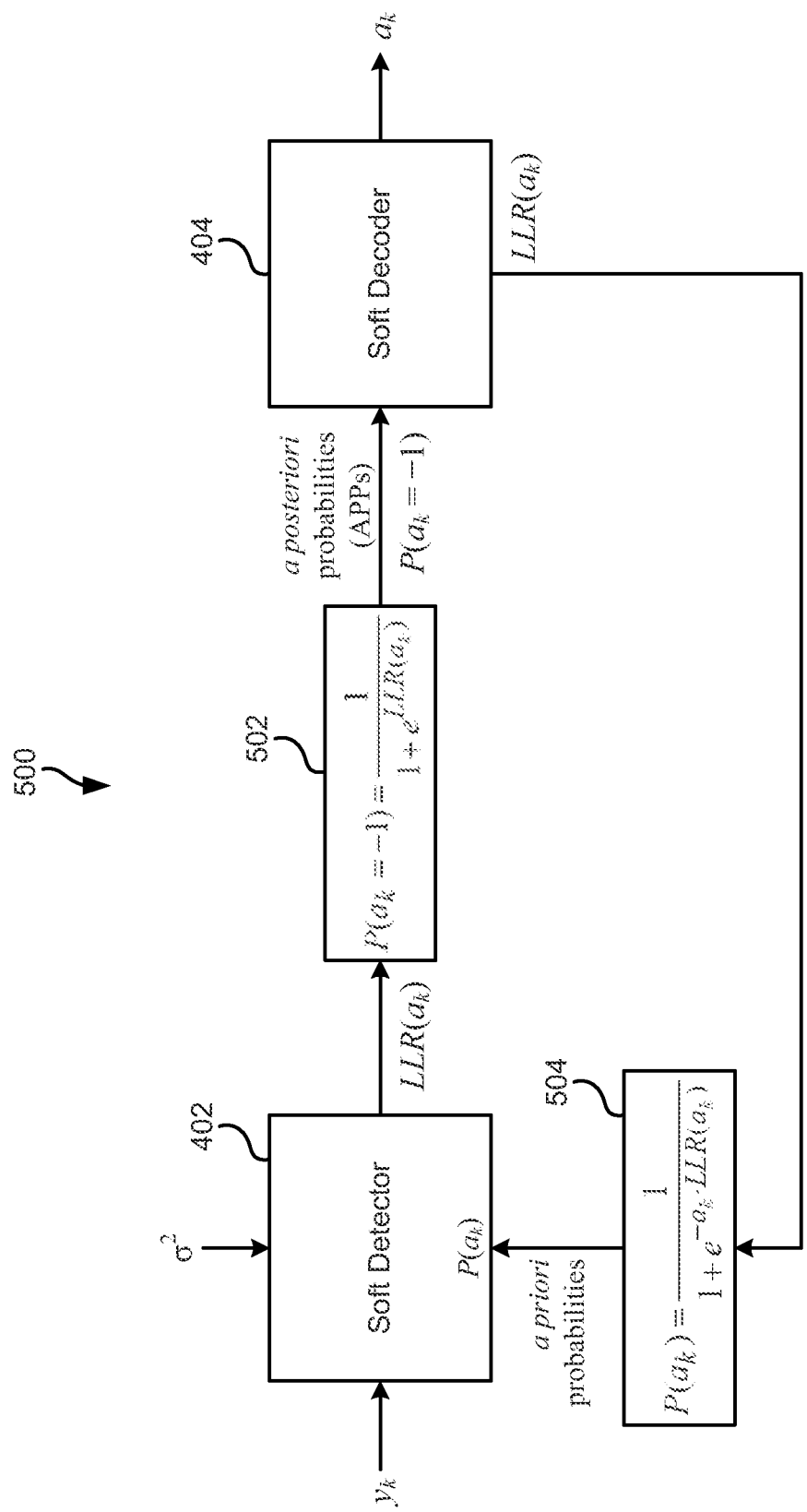
FIG. 5 is a system for exchanging soft information between detector and decoder for a magnetic tape recording channel, according to one embodiment.

A system 500 for exchanging soft information for a magnetic tape recording channel may be as shown in FIG. 5, according to one embodiment. In this embodiment, a soft detector 402 (which may be a DMAX detector) provides a tog likelihood ratio (WO to calculate a posteriori probabilities (APPs) 502 along with each read bit to a soft decoder 404 (which may be a low-density parity check (LPDC) decoder) which in turn provides the LLR to calculate a priori probabilities 504 of the bytes to the soft detector 402. Other types of soft detectors and soft decoders may be used as known in the art.

As indicated above, the detection operations involve a forward computation step and a backward computation step. These steps can be thought of as corresponding to running a Viterbi-algorithm-like computation on a channel trellis forward and backward. in time. One example is illustrated in FIG. 6, according to one embodiment.

Figure 6:
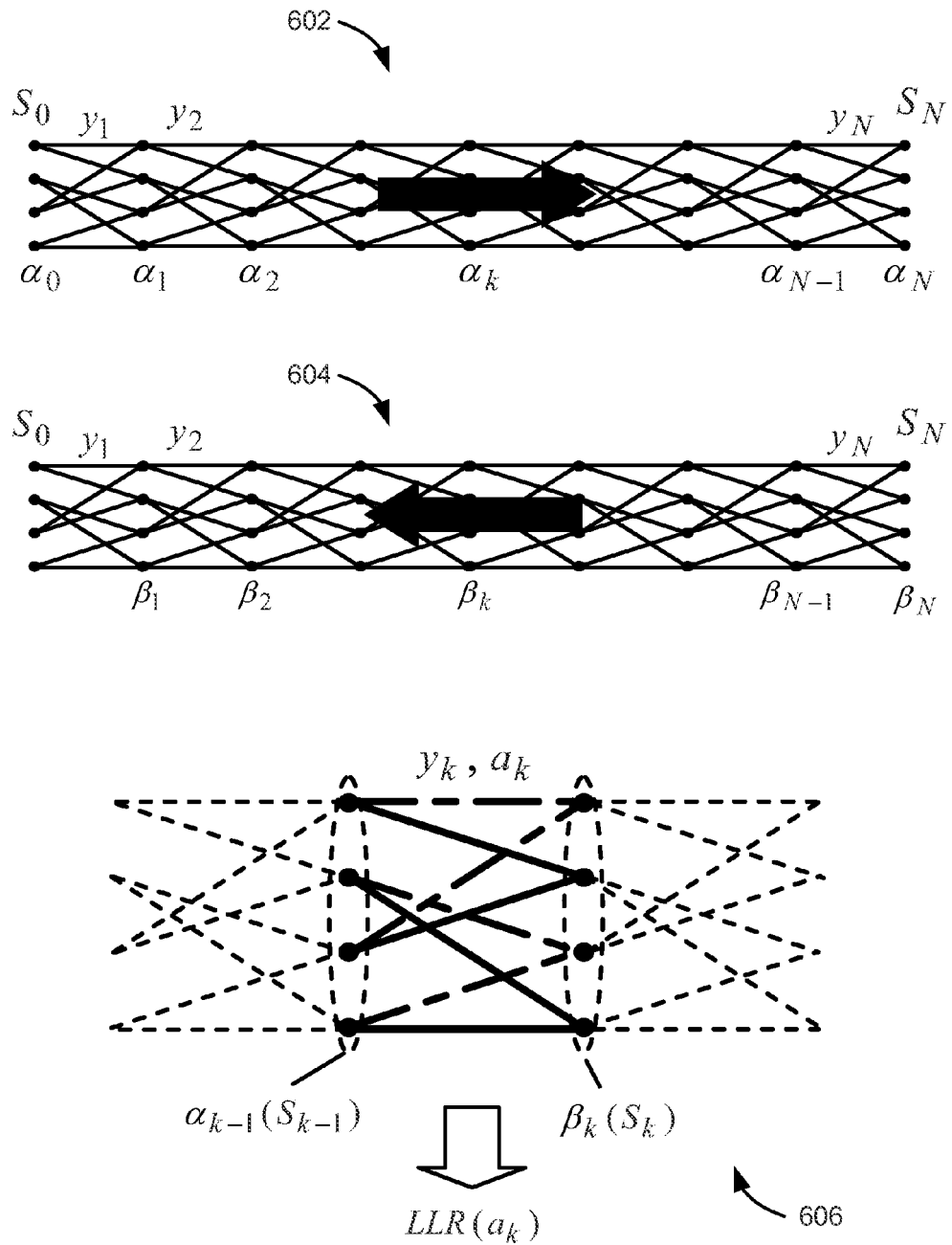
FIG. 6 shows Viterbi-algorithm-like computation on a channel trellis forward and backward in time, according to one embodiment.

In FIG. 6, it is assumed that a codeword having a block of N signal samples $y_1, \ldots, y_N$ is received at the soft detector. Upper diagram 602 shows a part of the algorithm that is applied forward in time assuming, for illustrative purposes, a simple 4-state trellis; state values at initial time 0 are denoted by $S_0$ and state values at final time N are denoted by $S_N$. The forward algorithm computes a set of values denoted by $\alpha_0, \alpha_1, \ldots, \alpha_N$. Middle diagram 604 shows the backward pass, where the quantities $\beta_N, \ldots, \beta_2, \beta_1$ are computed on the same trellis. Lower diagram 606 shows that by combining the values obtained in the forward and backward passes ($\alpha_0, \alpha_1, \ldots, \alpha_N$ and $\beta_1, \beta_2, \ldots, \beta_N$), it is possible to compute soft information (which is shown as a log-likelihood ratio LLR) on the individual bits $\alpha_k$ that form the codeword being processed. These LLR values may then be passed to the soft decoder, in one embodiment. Of course, in other approaches, other soft information may be calculated, such as other likelihood calculations, as would be known to one of skill in the art.

In the embodiments described in FIGS. 7-10, the soft detector uses a DMAX detection algorithm. Additionally, for the methods described below according to various embodiments, it is assumed that the DMAX detector is used at least twice: once in a first initial pass after receiving input signal samples where detection does not include using soft information from the soft decoder; and another time in at least a second pass where soft information provided by the soft decoder is used to detect the block of signal samples.

Figure 7:
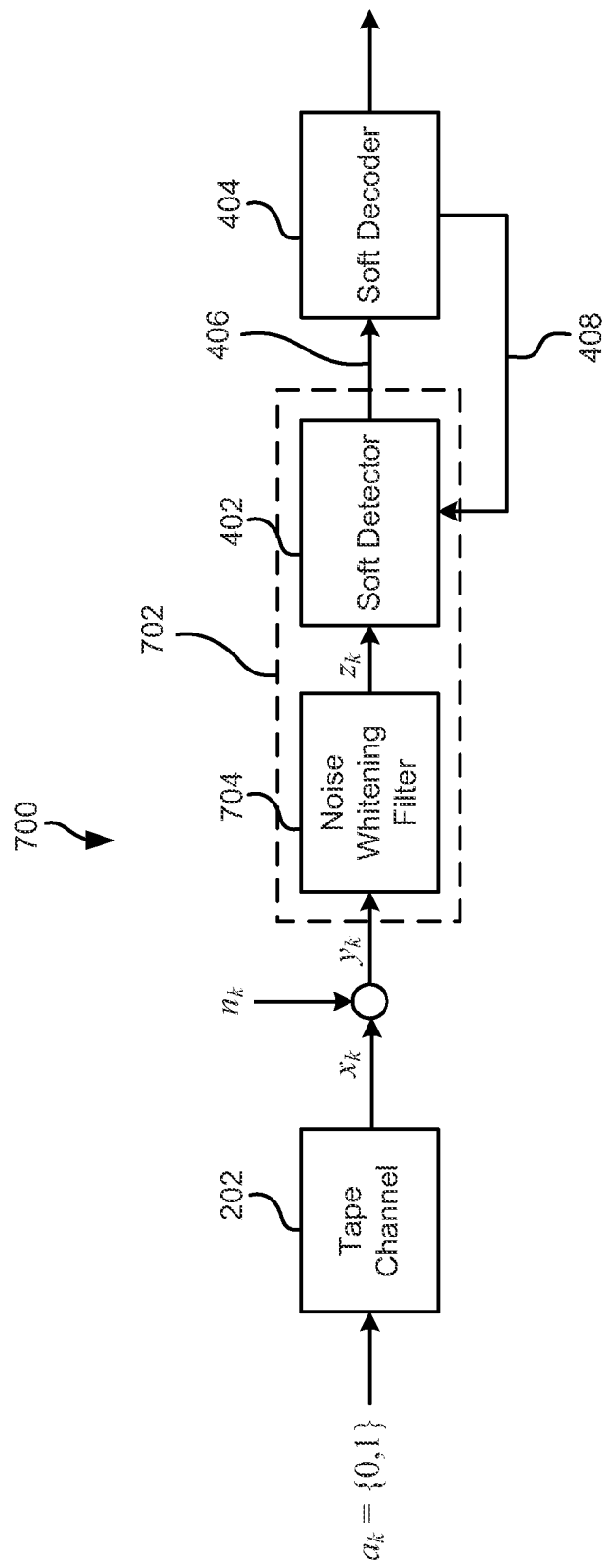
FIG. 7 shows one embodiment of a soft detection/decoding system using noise predictive soft Dual-MAX (DMAX) detection, according to one embodiment.

Referring now to FIG. 7, one embodiment of a soft detection/decoding system 700 using a noise predictive soft DMAX detector 702 is shown. After bits of data are read from the tape via the tape channel 202, where $x_k = a_k + f_1 a_{k-1} + \ldots + f_L a_{k-L}$, the signal $x_k$ affected by noise $n_k$ (which may be colored noise in some approaches) is denoted by $y_k$ (which equals $x_k + n_k$) is then subsequently input to a noise whitening filter 704. The output $z_k$ of the noise whitening filter 704 is then input to the soft detector 402 which provides a LLR to calculate APPs along with each read bit (shown as output 406) to the soft decoder 404. The soft decoder 404 next calculates a LLR for each bit to provide the APPs of the bits to the soft detector 402. In one embodiment, the soft detector 402 may be a DMAX soft detector, as described herein in more detail.

In one embodiment, a noise predictive soft :DMAX detector 702 (which includes the noise whitening filter 704 and the soft detector 402) may have $2^{L+\lambda}$ states, where L and $\lambda$ represent the memory length of the channel 202 and the noise whitening filter 704, respectively. This is because each of the L and $\lambda$ memory units corresponding to the channel and the whitening filter, respectively, are capable of storing a binary value of 0 or 1, and accordingly the noise predictive soft DMAX detector 702 may have a total of $2^{L+\lambda}$ states.

The noise whitening filter 704 attempts to minimize the variance of the noise affecting the signal $z_k$ that is input to the detector 702. In one approach, the whitening filter 704 my apply the following transfer function (polynomial) to $y_k$: $W(D) = 1 - (p_L D + \ldots + p_\lambda D^\lambda)$, where D represents delay corresponding to a bit duration, and the tape channel 202 itself is characterized by a transfer polynomial $F(D) = 1 + f_L D + \ldots + f_L D^L$.

The noise variance term now refers to the noise as seen at the output of the whitening filter 704, and the branch metric $ink(S_{k-1}, S_k)$ used by the detector 702, according to one embodiment, may be represented by:

$$m_k(S_{k-1}, S_k) = -\frac{(z_k - w_k)^2}{2\sigma_p^2} + \ln P(a_k)$$

with the prediction noise variance being $\sigma_p^2$, $w_k$ being an ideal nominal signal associated with transition from state $S_{k-1}$ to state $S_k$, and $z_k$ being the actual output of the noise whitening filter.

In more embodiments, more than one whitening filter 704 may be employed. For example, 2, 4, 8, 16, 32, 64, or more whitening filters 704 may be employed, such as in a bank of whitening filters. There may be M whitening filters 704 in the bank of whitening filters. In one approach, M may equal the number of branches of the soft detector 402 trellis, e.g., a number of state transitions of the soft detector 402, such as $2^{L+\lambda+1}$ filters.

According to another embodiment, the noise-predictive soft DMAX detector 702 may have normalization applied thereto. When the DMAX algorithm is normalized, the $\alpha$(forward) and $\beta$(backward) variables may be represented with a predetermined finite number of bits as opposed to the values of these variables growing in magnitude without bound, as is possible using conventional :DMAX algorithms. In addition, and advantageously, normalization does not affect LLR values. One normalization operation is shown below:

$$\alpha_k(S_k) = \max_{S_{k-1}} \{\alpha_{k-1}(S_{k-1}) + m_k(S_{k-1}, S_k)\} \quad (k = 1, \ldots, N)$$

Normalization find $A_k = \max_{S_k} \{\alpha_k(S_k)\}$, replace $\alpha_k(S_k) \to \alpha_k(S_k) - A_k \; \forall \; \alpha_k(S_k)$ $$\beta_{k-1}(S_{k-1}) = \max_{S_k} \{\beta_k(S_k) + m_k(S_{k-1}, S_k)\} \quad (k = N, \ldots, 2)$$

Normalization find $B_{k-1} = \max_{S_{k-1}} \{\beta_{k-1}(S_{k-1})\}$, replace $\beta_{k-1}(S_{k-1}) \to \beta_{k-1}(S_{k-1}) - B_{k-1} \; \forall \; \beta_{k-1}(S_{k-1})$ Of course, other algorithms for normalization may be possible as well, according to other embodiments.

In another embodiment, reduced state detection may be performed. As previously indicated, the soft detector 402 may have $2^{L+\lambda}$ states. It is possible to use a longer whitening filter 704 and still keep states in the detector trellis using reduced-state detection. In one approach, the whitening filter 704 may apply the following transfer polynomial to $y_k$: $W(D) = 1 - (p_L D + \ldots + p_\lambda D^{\lambda'})$, where where $\lambda'$ is greater than $\lambda$ and assuming that the tape channel 202 itself is characterized by a transfer polynomial $F(D) = 1 + f_L D + \ldots + f_L D^L$.

In this case, the bits defining states $S_{k-1}$ and $S_k$ are not enough to specify the bit string of length $L+\lambda+1$ needed to compute the system output $z_k$. Therefore, the missing bit(s) are taken from the path memory associated with each state $S_{k-1}$. The branch metric $mk(S_{k-1}, S_k)$ may then be written as follows:

$$m_k(S_{k-1}, S_k) = -\frac{\{z_k - w_k(S_{k-1})\}^2}{2\sigma_p^2} + \ln P(a_k)$$

where the notation $w_k(S_{k-1})$ indicates that the bit pattern that defines $w_k$, which is an ideal nominal signal associated with transition from state $S_{k-1}$ to state $S_k$, also depends on the path memory associated with the previous state $S_{k-1}$, the prediction noise variance is $\sigma p^2$, and $z_k$ is the actual ot put of the noise whitening filter.

Figure 8:
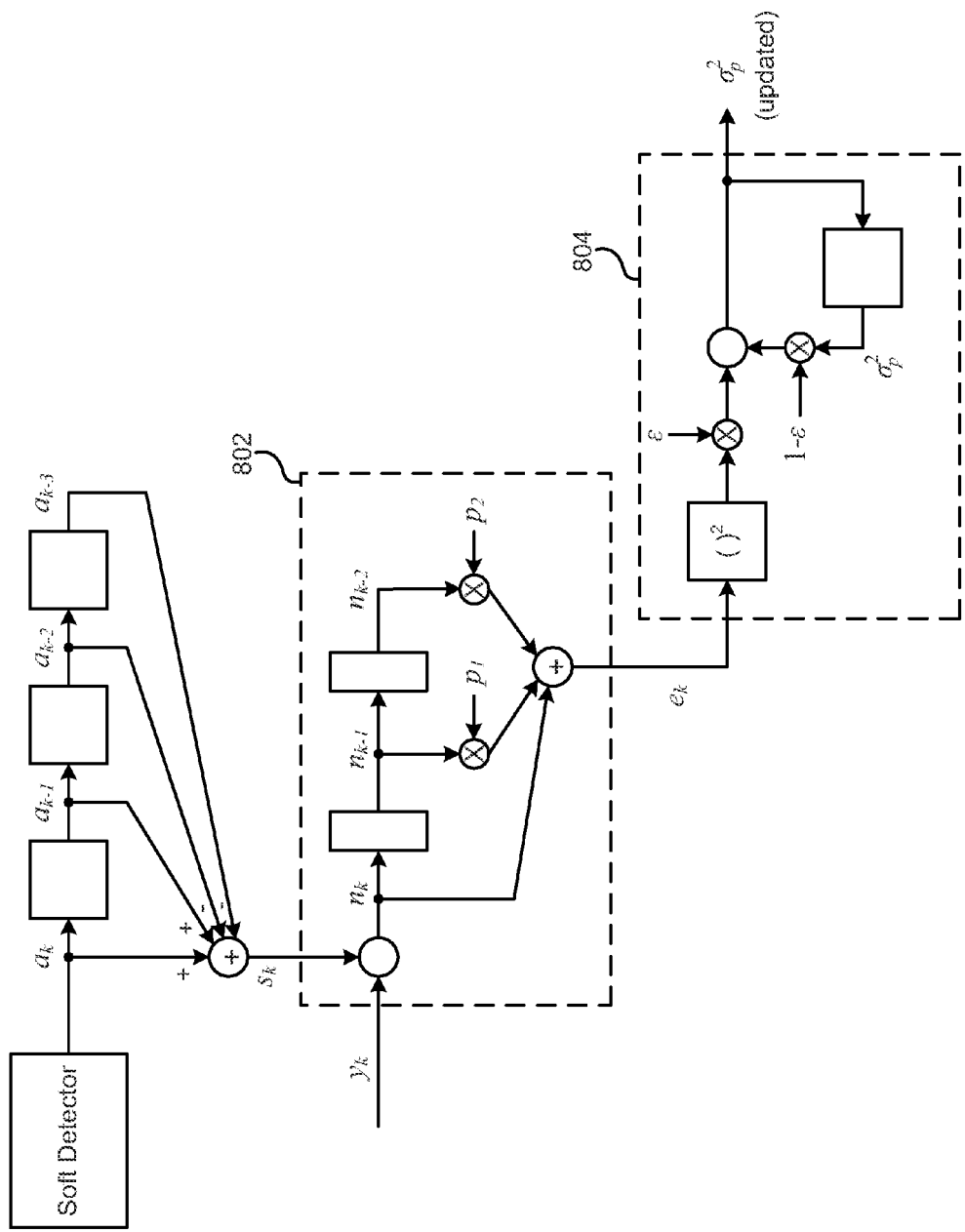
FIG. 8 shows an adaptive whitening filter coefficient updater, according to one embodiment.

In one embodiment, the whitening filter coefficients $p_1, p_2, \ldots p_\lambda$ may be estimated adaptively as shown in FIG. 8, a simplified version of which is described in U.S. Pat. No. 8,077,764, which is herein incorporated by reference. Referring again to FIG. 8, the whitening filter coefficients $p_1, p_2, \ldots, p_\lambda$ may be updated using a whitening filter coefficient updater 802 as follows ($\lambda = 2$ is shown for simplicity in FIG. 8):

$p_1 \leftarrow p_1 + \alpha e_k \hat{n}_{k-1}$ $p_2 \leftarrow p_2 + \alpha e_k \hat{n}_{k-2}$ where $\alpha$ is the adaptation stepsize, $e_k$ is the error signal, and $\hat{n}_{k-1}, \hat{n}_{k-2}$ are the noise estimates at previous time instants. The corresponding whitening function may be defined as follows:

$W(D) = 1 - (p_L D + p_2 D^2)$

Furthermore, the error signal $e_k$ may be input to a prediction noise variance coputation 804 where prediction noise variance $\sigma_p^2$ is computed based on the error signal $e_k$, and a small number a (e.g., 0.001). In the embodiment shown in FIG. 8, the last calculated prediction noise variance $\sigma_p^2$ is used to calculate the next (updated) prediction noise variance $\sigma_p^2$.

However, the noise which exists at the output of the tape channel is not just colored noise, but may also include data dependent noise, which is common in magnetic recording. Accordingly, the soft detector may be devised to take into account this data dependent noise, and therefore do a better job in detecting the bits in the signal. The data dependent nature of the noise may be taken into account in the detection process to achieve better performance in detecting the bits.

The noise that generally affects magnetic data recording systems nyuicomim either electronics noise or medium noise. It is a combination of these noise sources that produces noise that is difficult to remove from the signal. Noise from the electronics may be either white or colored, but it is not data dependant. The medium noise is a data dependent noise: this type of noise is specific to magnetic recording channels because it corresponds to the written transition in the medium and the position and/or the width of the transition may be variable. There is no certainty in how long the transition is, where the transition is positioned, etc. addition, if a transition is not written, then this type of noise will not affect the readback signal from the medium.

This is why medium noise is actually data dependent, because a transition is actually written when there is a transition between bits and it is only then that medium noise will manifest itself, To accommodate for this, instead of having only one noise Whitening filter as previously described in relation to FIG. 7, mor than one noise whitening filter may be present, such as two, four, eight, sixteen, etc., and each of these noisewhitening filters is conducting filtering based on a unique possible data pattern being read, For example, the noise whitening filter coefficients may correspond to the particular data pattern associated vith that particular noise hitening filter. In one example, if the detector is attempting to determine the likelihood of $a_k$ and $a_{k-1}$, which may be 0 0, 0 1, 1 0, or 1 1, four noise whitening filters may be used, one dependent on each of the possible data patterns. For the four noise whitening filter outputs each corresponding to one of the four possible data patterns, the likelihood of each data pattern is computed by the soft detector. For example, the soft DMAX detector receives outputs from each of the noise whitening filters in the bank of noise whitening filters and calculates a likelihood of a data pattern associated with each of the outputs. Accordingly, the filtering is data dependent, since each noise whitening fitter is tailored to be specific to a particular data pattern.

Figure 9:
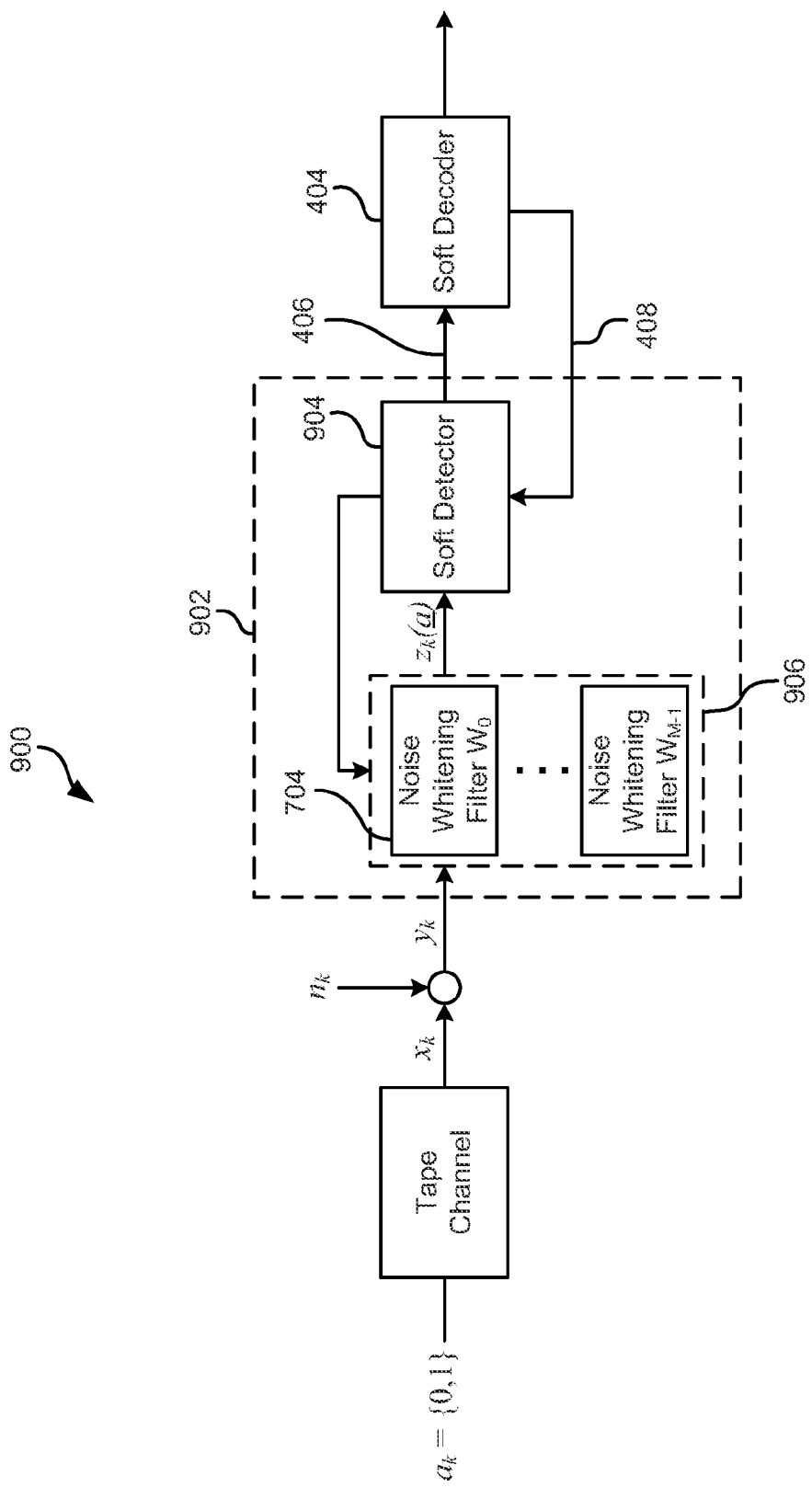
FIG. 9 shows a soft detection/decoding system using a soft noise-predictive data-dependent (DD) DMAX detector, according to one embodiment.

Referring now to FIG. 9, one embodiment of a. soft detection/decoding system 900 using a soft noise-predictive data-dependent (DID) DMAX detector 902 is shown. As shown, multiple whitening filters 704 are used in a bank of whitening filters 906. However, this is n - required, as a single whitening fitter 704 may be used, or any number thereof, e.g., 2, 4, 8, 16, 32, 64, or more, Magnetic recording systems are typically affected by electronics noise as well as medium noise from the tape medium itself. Medium noise results primarily from transition position/width variations encountered during recording operations. Since positions and shapes of magnetization transitions are determined by the symbols to be written as bits on the tape medium, medium noise depends on the input data sequence, as understood by those of skill in the art.

As previously described, the soft DD-DMAX detector 904 may have $2^{L+\lambda}$ states, and there are $M=2^{L+\lambda+1}$ noise whitening fitters (that is, one whitening filter 704 per detector branch). Thus, the characteristics of the noise whitening filters 704 enter both the forward and the backward recursions on the detector trellis. The prediction noise variance $\sigma_p^2(a)$ refers to the noise as seen at the output of each whitening filter 704, and the branch metric $mk(S_{k-1}, S_k)$ may be calculated as follows:

$$m_k(S_{k-1}, S_k) = -\frac{1}{2}\ln\{\sigma_p^2(a)\} - \frac{\{z_k(a) - w_k(a)\}^2}{2\sigma_p^2(a)} + \ln P(a_k)$$

where a is the data pattern corresponding to state transition $S_{k-1} \rightarrow S_k$. In the branch metric equation, $w_k(a)$ is an ideal nominal signal associated with transition from state $S_{k-1}$ to state $S_k$, and $z_k(a)$ is the actual output of the noise whitening filter.

According to another embodiment, the soft noise-predictive DD-DNIKK detector 902 may have normalization applied thereto. When the DMAX algorithm is normalized, the $\alpha$(forward) and $\beta$ (backward) variables may be represented with a predetermined finite number of bits as opposed to the values of these variables growing in magnitude without bound, as is possible using conventional DMAX algorithms. In addition, and advantageously, normalization does not affect LLR. values. One normalization operation is shown below:

$$\alpha_k(S_k) = \max_{S_{k-1}}\{\alpha_{k-1}(S_{k-1}) + m_k(S_{k-1}, S_k)\}$$

$$(k = 1, \ldots, N)$$

Normalization find $A_k = \max_{S_k}\{\alpha_k(S_k)\}$, replace $\alpha_k(S_k) \rightarrow \alpha_k(S_k) - A_k \; \forall \; \alpha_k(S_k)$ $$\beta_{k-1}(S_{k-1}) = \max_{S_k}\{\beta_k(S_k) + m_k(S_{k-1}, S_k)\}$$

$$(k = N, \ldots, 2)$$

Normalization find $B_{k-1} = \max_{S_{k-1}}\{\beta_{k-1}(S_{k-1})\}$, replace $\beta_{k-1}(S_{k-1}) \rightarrow \beta_{k-1}(S_{k-1}) - B_{k-1} \; \forall \; \beta_{k-1}(S_{k-1})$ Of course, other algorithms for normalization may be possible as well, according to other embodiments.

In one embodiment, each noise whitening filter 704 in the noise whitening filter bank 906 may use a whitening function to minimize the variance of the noise affecting its output signal. In one approach, the whitening filter 704 may apply the following transfer polynomial to $y_k$: $W(D)=1-(p_1 D+ \ldots + p_\lambda D^\lambda)$ assuming that the tape channel 202 itself is characterized by a transfer polynomial $F(D)=1+f_L D+ \ldots +f_L D^L$.

In another enibodinient, the number of noise whitening filters 704 in the noise whitening filter bank 906 may equal the number of branches in the detector's trellis structure, e.g., a number of state transitions of the soft noise-predictive DD-DMAX detector 902. In another embodiment, the number of noise whitening filters 704 in the noise whitening filter bank 906 may depend on a longer bit pattern than the pattern defined by state transitions, i.e., there will be more noise whitening filters 704 than there are branches on the detector trellis.

Accordingly, the bits defining states $S_{k-1}$ and $S_k$ will be insufficient to match on a one-to-on basis with a. whitening filter; therefore, the missing bits may be taken from path memory associated with each state $S_{k-1}$. The branch metric $m_k(S_{k-1}, S_k)$ for this calculation may be written as follows, in one approach:

$$m_k(S_{k-1}, S_k) = -\frac{1}{2}\ln\{\sigma_p^2[\underline{a}(S_{k-1})]\} - \frac{(z_k[\underline{a}(S_{k-1})] - w_k[\underline{a}(S_{k-1})])^2}{2\sigma_p^2[\underline{a}(S_{k-1})]} + \ln P(a_k)$$

where the notation $\underline{a}(S_{k-1})$ indicates that the bit pattern a that defines a specific whitening filter also depends on the path memory associated with the previous state $S_{k-1}$, and where In yet another embodiment, each noise whitening filter 704 in the noise whitening filter bank 906 may depend on a shorter bit pattern than the pattern defined by state transitions, i.e., there will be less noise whitening filters 704 than branches of the detector trellis; therefore, the same noise whitening filter 704 may be used more than once in the detector trellis.

For example, if in an 8-state detector trellis a is selected as $\underline{a} = (a_k, a_{k-1}, +a_{k-2})$, then the two distinct branches shown below may use the same noise whitening filter 704.

$$S_k(a_{k-1}, a_{k-2}, a_{k-3}=0) \rightarrow S_{k+1}:(a_k, a_{k-1}, a_{k-2})$$

$$S_k:(a_{k-1}, a_{k-2}, a_{k-3}=1) \rightarrow S_{k+1}:(a_k, a_{k-1}, a_{k-2})$$

In another embodiment, reduced state detection may be performed on any of the longer, shorter, or equal bit pattern schemes described previously. In reduced state detection, the whitening filter 704 may extend over a longer time span (i.e., a longer memory), but the soft detector 904 may use the same amount of states as before. As previously indicated, the soil, detector 904 may have $2^{L+\lambda}$ states. It is possible to use a longer whitening filter 704 and still keep $2^{L+\lambda}$ states in the detector trellis using reduced-state detection. In this case, the bits defining states $S_{k-1}$ and $S_k$ are not enough to specify the bit string of length $L+\lambda+1$ needed to compute the system output $z_k$. In this case, the noise whitening filters may apply the following transfer polynomial: $W(D) = 1-(p_{L,L}D+\ldots+p_{L,\lambda}D^{\lambda'})$, where $p_{i,1} \ldots p_{i,\lambda'}$ are noise whitening coefficients, i is 0 to M−1 where M is a total number of noise whitening filters in the bank of noise whitening filters, the tape channel may be characterized by a transfer polynomial $F(D)=1+f_LD+\ldots+f_LD^L$, with $2^L$ being a number of states of the tape channel, wherein the soft detector has a total of $2^{L+\lambda}$ states, and the noise whitening filter ideally (without state reduction) leading to $2^{\lambda'}$ states, with $\lambda'$ being greater than $\lambda$.

Therefore, the missing bit(s) are taken from the path memory associated with each state $S_{k-1}$. The branch metric $m_k(S_{k-1}, S_k)$ may then be written as follows:

$$m_k(S_{k-1}, S_k) = -\frac{1}{2}\ln\{\sigma_p^2[\underline{a}(S_{k-1})]\} - \frac{(z_k[\underline{a}(S_{k-1})] - w_k[\underline{a}(S_{k-1})])^2}{2\sigma_p^2[\underline{a}(S_{k-1})]} + \ln P(a_k)$$

where the notation $w_k[\underline{a}(S_{k-1})]$ indicates that the bit pattern that defines wk, which is an ideal nominal signal associated with transition from state $S_{k-1}$ to state $S_k$, also depends on the path memory associated with the previous state $S_{k-1}$, and where $\sigma p^2[\underline{a}(S_{k-1})]$ is data-pattern and previous-state dependent prediction noise variance.

Figure 10:
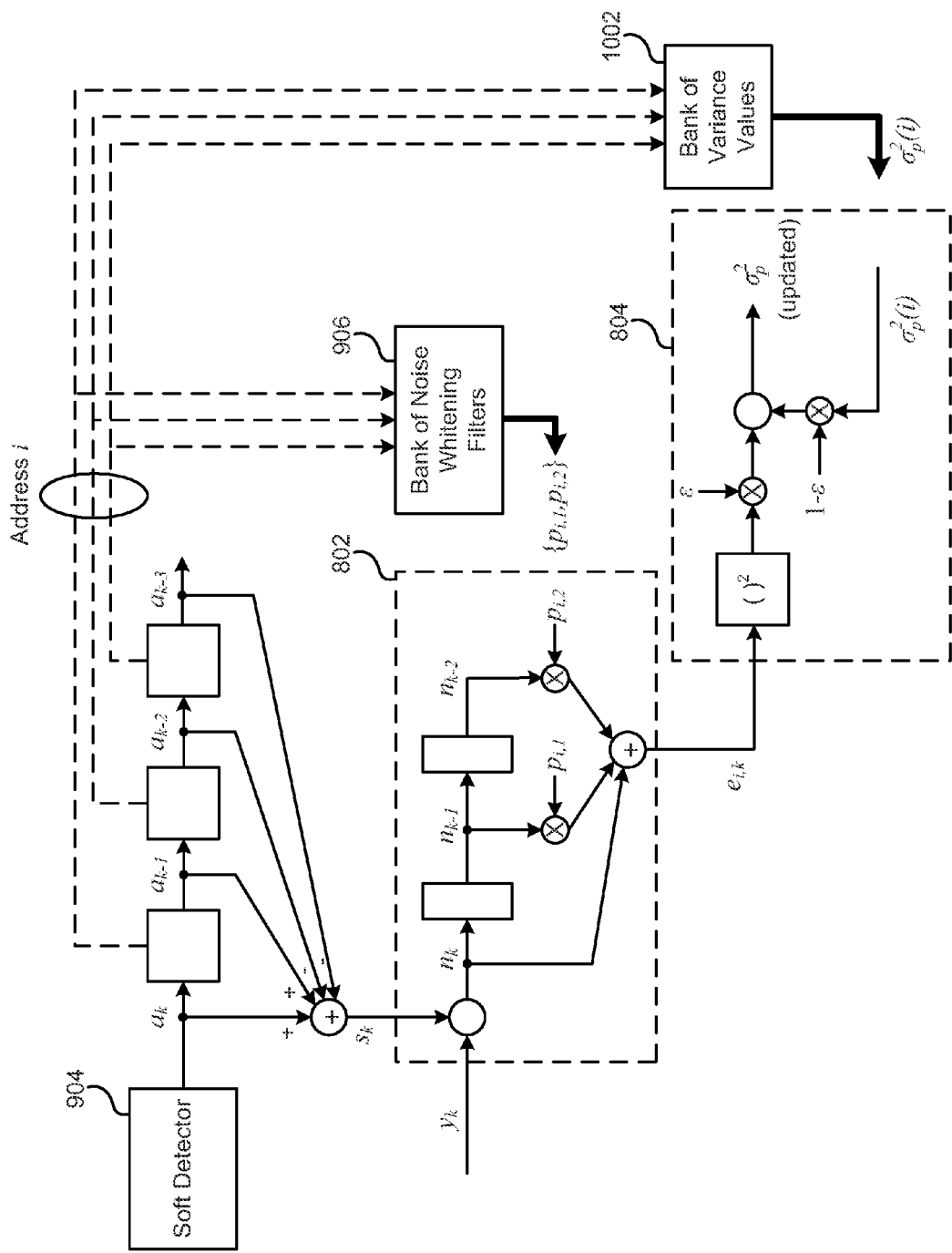
FIG. 10 shows an adaptive whitening filter coefficient updater, according to one embodiment.

In another embodiment, the whitening filter coefficients $p_{i,1}, p_{i,2}, \ldots, p_{i,\lambda}$ may be estimated adaptively as shown in FIG. 10, a simplified version of which is described in U.S. patent application Ser. No. 12/753,586, which is herein incorporated by reference. Referring again to FIG. 10, the whitening filter coefficients $p_{i,1}, p_{i,2}, \ldots, p_{1,\lambda}$ may be updated using a whitening filter coefficient updater 802 from soft information as follows (in FIG. 10, $\lambda=2$ is assumed for illustration purposes):

$$p_{i,1} \leftarrow p_{i,1} + \alpha e_{i,k}\hat{n}_{k-1}$$

$$p_{i,2} \leftarrow p_{i,2} + \alpha e_{i,k}\hat{n}_{k-2}$$

where $\alpha$ is the adaptation stepsize, $e_{i,k}$ is the error signal based on the address i (in this example, 64 whitening filters 704 are assumed, but any number may be used), and $\hat{n}_{k-1}$ are the noise estimates from previous time instants, e.g., previous noise estimates. In addition, the whitening filter transfer polynomial may be defined as follows:

$$W_i(D)=1-(p_{i,1}D+p_{i,2}D^2), i=0, \ldots 63$$

were $i=0,\ldots, 63$ based on 64 whitening filters 704 in the bank of whitening filters 906.

Furthermore, the error signal $e_{i,k}$ may be input to a prediction noise variance computation 804 where prediction noise variance $\sigma_p^2$ is computed based on the error signal $e_{i,k}$, and a small number $\epsilon$ (e.g., 0.001). In the embodiment shown in FIG. 10, the prediction noise variance $\sigma_p^2(i)$ that is used to calculate the next prediction noise variance $\sigma_p^2$ is input from the bank of variance values 1002. The number of variance values in the bank of variance values 1002 may number the same as the number of whitening filters 704 in the bank of whitening filters 906, according to one embodiment.

In some instances, the tape may he written by a drive having a precoder positioned before the C1 encoder, e.g., an LDPC encoder and no precoder positioned after the encoder and/or immediately adjacent the write channel. In such case, the detector functions as noted elsewhere herein. However, if the tape was written by a drive with a precoder positioned after the C1 encoder and/or immediately adjacent the write channel, then the system may automatically compensate during signal detection for the effect on the data caused by the precoder in such position in the writing device. In either case, the data may have a characteristic of being passed through at least one (precoder prior to being written to the magnetic tape medium.

Figure 11:
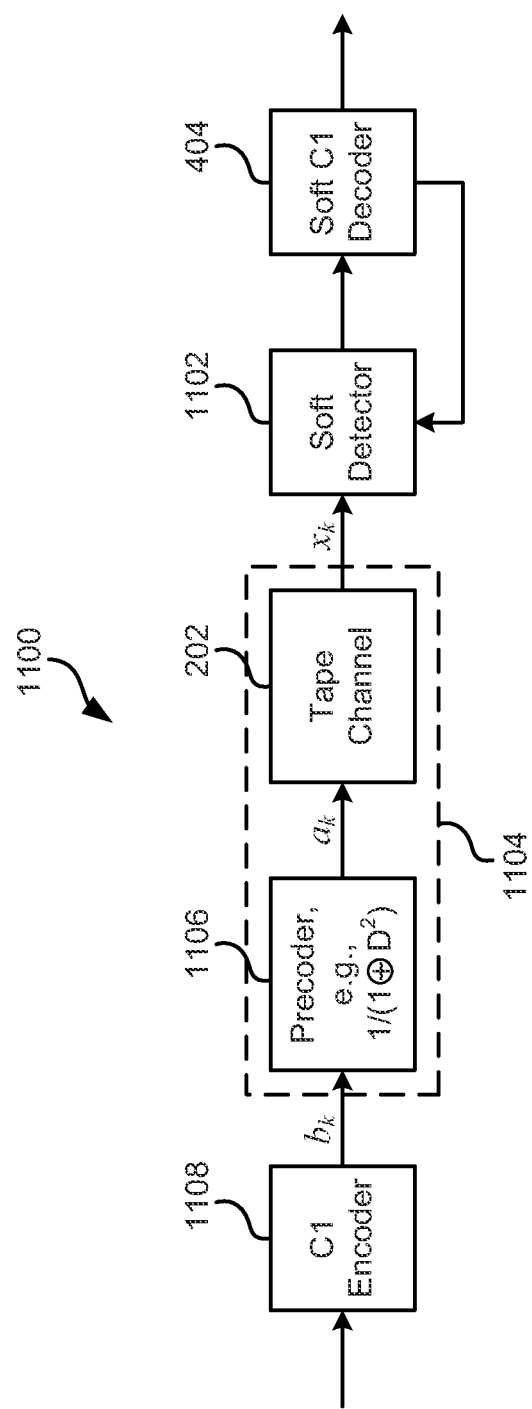
FIG. 11 shows one embodiment of a soft detection/decoding system which uses a soft detector that provides automatic compensation for the presence of precoding in a tape channel, according to one embodiment.

The drive performing data readback may determine if and how the data has been precoded in any of the manners described above and below in a manner known in the art, such as detecting such information from the tape itself, cartridge memory, etc, Referring now to FIG. 11, there is shown a representation of a tape drive system 1100 which uses, in a reading section, a soft detector 1102 that provides automatic compensation for the presence of precoding in the tape channel 1104. As shown, in the precoded tape channel 1104, a precoder 1106 is positioned after a C1 encoder 1108 and immediately prior to a tape channel 202, such that the output of the C1 encoder 1108 is sent to the precoder 1106, which, in turn, sends the precoder output to the tape channel 202 for writing on the tape. The tape channel 202 is shown as a single module representing respective components of the read and the write section, as would be understood by one skilled in the art.

The data which passes through the precoder 1106 may be described as having a characteristic of being passed through a precoder, such that the data may be handled differently and/or compensated for in a detector which reads a tape which has precoded data recorded thereon.

Figure 12:
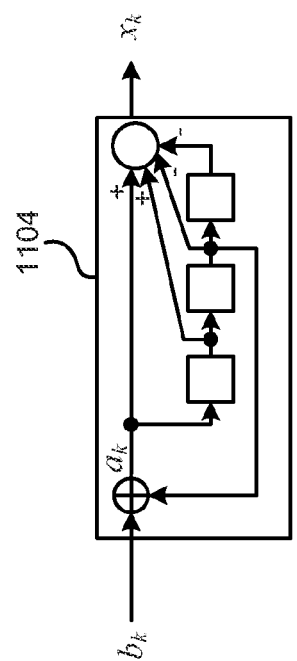
FIG. 12 shows one embodiment of a precoded tape channel.
Figure 12:
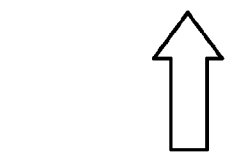
Figure 12:
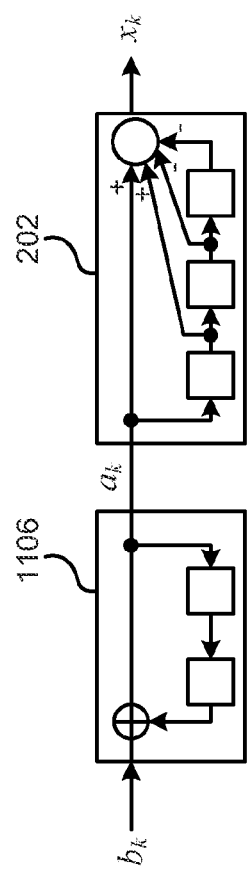

One embodiment of the precoded tape channel 1104 is shown in FIG. 12, As shown, the algorithms provided by the precoder 1106 and the tape channel 202 may be combined, as represented by the precoded tape channel 1104. Referring now to FIGS. 11-12, bits of data, $b_k$, are sent to the precoder 1106. The precoder 1106 may apply the following equation to $b_k$: $(1/(1 \oplus D^2))$ where D is delay corresponding to a bit duration, After the output, $a_k$, of the precoder 1106 is read from the tape via the tape channel 202, the noiseless signal may be represented, for example, as an extened partial-response class 4 (EPR4) signal $x_k=a_k+a_{k-1}-a_{k-2}-a_{k-3}$. The soft detector 1102 provides automatic compensation for the presence or absence of a precoder 1106 adjacent the write channel in the writing device by accounting for the precoding function that the prk.coder 1106 applies to the data before it is written to the tape and clearly also for the transformation that the tape channel 202 applies to the data as it is read from the tape.

For example, in one embodiment, the soft detector 1102 providing automatic compensation for the presence of a precoded tape channel 1104 may calculate the LLR as follows:

$$LLR(b_k) = \max_{\beta_1}\{\alpha_{k-1}(S_{k-1}) + m_k(S_{k-1}, S_k) + \beta_k(S_k)\} - \max_{\beta_0}\{\alpha_{k-1}(S_{k-1}) + m_k(S_{k-1}, S_k) + \beta_k(S_k)\}$$

where $\beta_0$ is the set of all branches in the detector trellis corresponding to the state transitions $S_{k-1} \rightarrow S_k$ having label $b_k=0$, and $\beta_1$ is the set of all branches in detector trellis corresponding to the state transitions $S_{k-1} \rightarrow S_k$ having label $b_k=1$. The branch metric $mk(S_{k-1}, S_k)$ may then be written as follows:

$$m_k(S_{k-1}S_k) = -(y_k - x_k)^2/(2\sigma^2) + \ln P(b_k)$$

where the a priori probabilities $P(b_k)$ provided by the soft C1 decoder 404 correspond to the appropriate $b_k$-labeled branch being considered (i.e., $b_k=0$ or $b_k=1$).

In one approach, the soft detector 1102 providing automatic compensation for the presence of a precoded tape channel 1104 may be a noise predictive soft DMAX detector with a noise whitening filter. In another approach, the soft detector 1102 providing automatic compensation for the presence of a precoded tape channel 1104 may be a soft noise-predictive DD-DMAX detector with one or more noise whitening filters. In addition, any of these e bodiments may be used in a reduced state detector, as described in more detail herein.

In accordance with one embodiment, the soft detector 1102 providing automatic compensation for the presence of a precoded tape channel 1104 may retain the same number of states and state transitions (e.g., branches) as in the case where precoding is not used. Additionally, the soft detector 1102 providing automatic compensation for the presence of a precoded tape channel 1104 may retain the same branch labeling with nominal output signal xi as in the case where precoding is not used.

Figure 13:
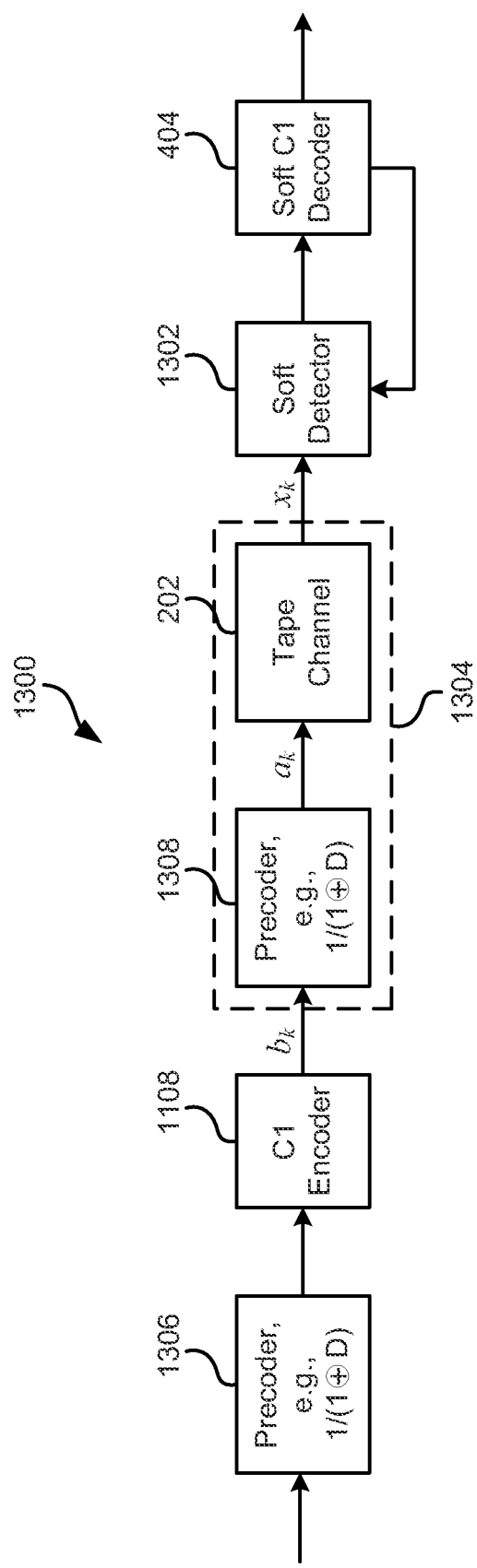
FIG. 13 shows one embodiment of a soft detection/decoding system which uses a soft detector that provides automatic compensation for the presence of precoding in a tape channel, according to one embodiment.

Referring now to FIG. 13, another representation of a tape drive system 1300 is shown using, in a reading section, a soft detector 1302, which provides automatic compensation for a precoded tape channel 1304. Such soft detector 1302 and decoder 404 may be configured the same as the soft detector 1102 and decoder 404 in FIG. 11. As shown in FIG. 13, however, a first precoder 1306 is positioned before a C1 encoder 1108, such that the output of the first precoder 1306 is sent to the C1 encoder 1108. in addition, a second precoder 1308 is positioned after the C1 encoder 1108 and immediately prior to a tape channel 202 in the precoded tape channel 1304, such that the output of the C1 encoder 1108 is sent to the second precoder 1308, which, in turn, sends the second. precoder output to the tape channel 202. Again, the tape channel 202 is shown as a single module representing respective components of the read and the write section, as would be understood by one skilled in the art, The data which passes through the precoders 1306, 1308 may be described as having a characteristic of being passed through at least one precoder, such that the data may be handled differently and/or compensated for in a detector which reads a tape which has precoded data recorded thereon.

Figure 14:
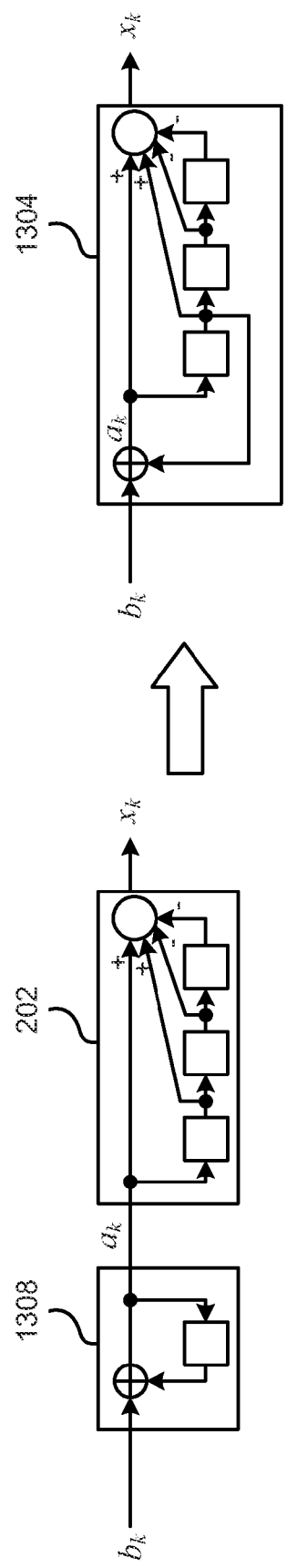
FIG. 14 shows one embodiment of a precoded tape channel.

One embodiment of the precoded tape channel 1304 is shown in FIG. 14. As shown, the algorithms provided by the second precoder 1308 and the tape channel 202 may be combined, as represented by the precoded tape channel 1304. Now referring to FIGS. 13-14, bits of data, $b_k$, are sent to the second precoder 1308. In one embodiment, the precoder 1308 may apply the following equation to $b_k$: $1/(1 \oplus D)$ where D is delay corresponding to bit duration. The output, $a_k$, of the precoder 1308 is then read from the tape via the tape channel 202 to generate noiseless signal $x_k$, which in this example is represented as an EPR4 signal $x_k=a_k+a_{k-1}-a_{k-2}-a_{k-3}$. The soft detector 1302 provides automatic compensation for the presence or absence of a second precoder 1308 adjacent the write channel in the writing device by accounting for the algorithm that the second precoder 1308 applies to the data before it is written to the tape and for the transformation that the tape channel 202 applies to the data as it is read from the tape.

In one embodiment, the first precoder 1306 may apply the following equation to its input: $1/(1 \oplus D)$ where D is repetitive delay.

Furthermore, in one embodiment the soft detector 1302 providing automatic compensation for the presence of a precoded tape channel 1304 may be a noise predictive soft DMAX detector with a noise whitening filter. In another approach, the soft detector 1302 providing automatic compensation for the presence of a precoded tape channel 1304 may e a soft noise-predictive DD-DMAX detector with one or more noise whitening filters. In addition, any of these embodiments may be used in a reduced state detector, as described in more detail herein.

In accordance with one embodiment, the soft detector 1302 providing automatic compensation for the presence of a prk-.coded tape channel 1304 may retain the same number of states and state transitions (e.g., branches) as in the case where precoding is not used. Additionally, the soft detector 1302 providing automatic compensation for the presence of a precoded tape channel 1304 may retain the same branch labeling with nominal output signal $x_k$, as in the case where precoding is not used.

As the above examples describe, the soft detector is capable of providing automatic compensation for precoded data by selecting a particular algorithm based on whether or not the precoded data was written to the magnetic tape medium by a device having a premier positioned immediately adjacent a write channel.

However, is some cases, it is possible to use the same algorithm, such as a DMAX a rithm, precoded and non-precoded data. In these cases, the soft detector is capable of providing automatic compensation for the precoded data by interpreting state transition calculations (detector trellis branches) based on a type of precoding used in a precoder positioned immediately adjacent a write channel, In these cases, it is possible for the soft detector to use a same number of states (memory) where data was written to the magnetic tape medium via a precoder positioned immediately adjacent a write channel or not (e,g., the data was written to the magnetic tape medium without a precoder).

Figure 15:
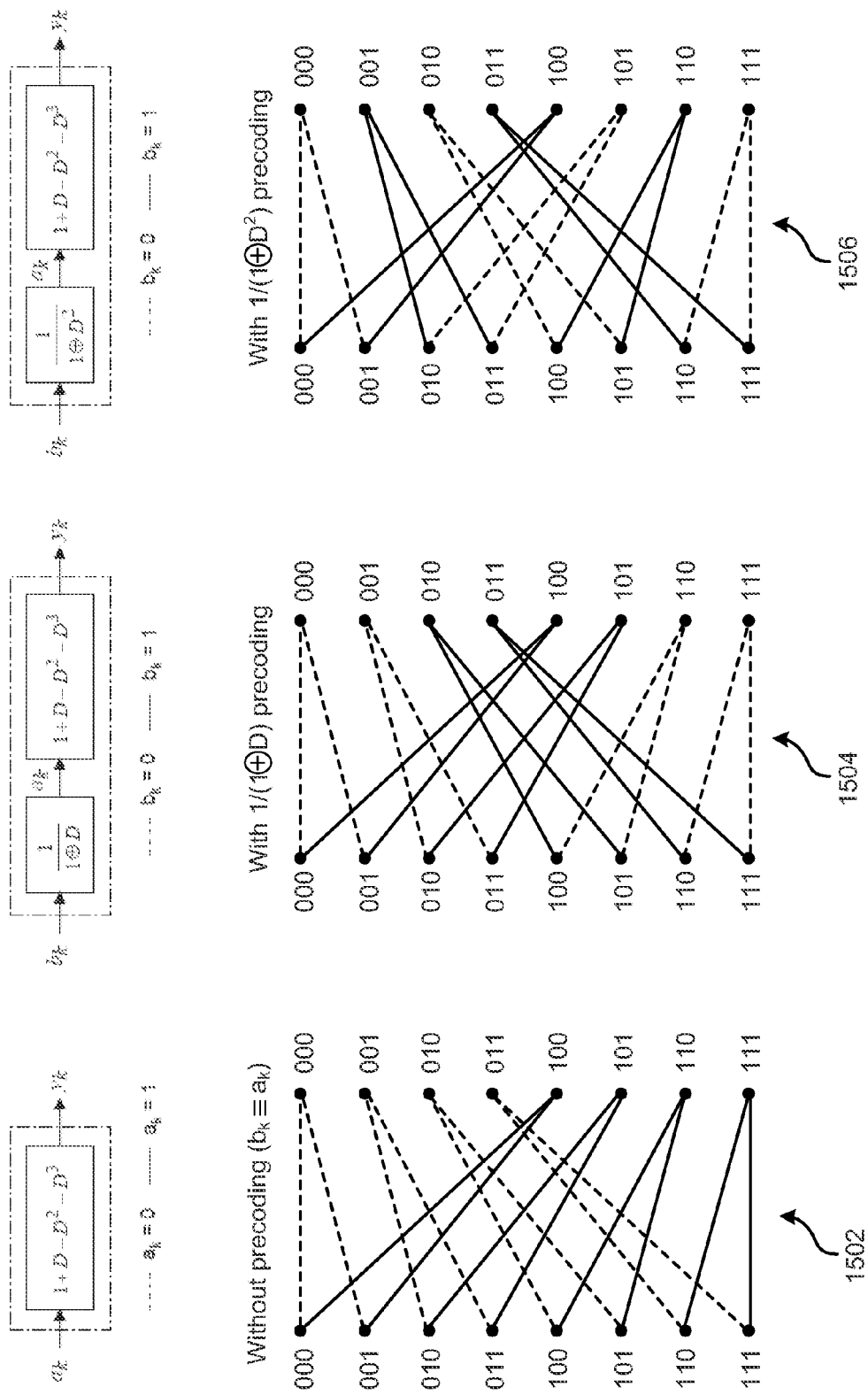
FIG. 15 shows examples of trellis structures according to various embodiments.

Referring now to FIG. 15, examples of specific precoding cases are shown, according to several embodiments. In trellis structure 1502 on the left side of FIG. 15, the trellis structure is shown for a case where no precoding is used, i.e., $b_k \equiv a_k$. As can be seen, the trellis structure 1502 shows dashed lines for branches where $b_k \equiv a_k$ is 0, and solid lines for branches where $b_k = a_k$ is 1. For this example, an 8-state detector would be used, as the detector has memory for $a_{k-1}$, $a_{k-2}$, and $a_{k-3}$ in order to calculate $a_k$.

Referring now to trellis structure 1504, in an example using $1/(1 \oplus D)$ precoding, it can be seen that the same state transitions ($S_{k-1} \rightarrow S_k$) occur (branches) as in the non-precoding case, but some of these state transitions are interpreted differently from the non-precoding example shown as trellis structure 1502. For example, in trellis structure 1504, the branch from 110 to 111 now represents $b_k=0$, instead of $a_k=1$ as in trellis structure 1502.

Similarly, referring to trellis structure 1506, in an example using $1/(1 \oplus D^2)$ precoding, it can be seen that the same state transitions ($S_{k-1} \rightarrow S_k$) occur (branches) as in the non-precoding case, but some of these state transitions are interpreted differently from the non-precoding example shown as trellis structure 1502. For example, in trellis structure 1506, the branch from 010 to 001 now represents $b_k=1$, instead of $a_k=0$ as in trellis structure 1502.

It should be noted that the exact same branches occur for each of the precoded and non-precoded trellis structures. In addition, it should be noted that the same number of states may be used in the detector for calculating bit estimations regardless of whether the data is precoded or not.

Also, the types of precoding and/or algorithms used in the examples described herein are not meant to be limiting on what types of preceding and/or algorithms may be used in combination with other embodiments and/or approaches described herein. Any type of precoding and/or algorithm known in the art may be usel In addition, the tape channel examples used herein, EPR4, is not meant to be limiting on what type of tape channel transfer function may be used in conjunction with any embodiments and/or approaches described herein. Any tape channel transfer function known in the art may be used. Furthermore, the whitening filter transfer polynomial examples used herein, are not meant to be limiting on what type of whitening filter transfer function may be used in conjunction with any embodiments and/or approaches described hereinkny whitening filter transfer function known in the art may be used.

The flowchart and block diagrams in the Figures illustrate the architecture, functionality, and operation f possible implementations of systems, methods and computer program products according to various embodiments of the present invention. In this regard, each block in the flowchart or block diagrams may represent a module, segment, or portion of code, which comprises one or more executable instructions for implementing the specified logical function(s), It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or contbinations of special purpose hardware and computer instructions.

While various embodiments have been described above, it should be understood that they have been presented by way of example only, and not limitation, Thus, the breadth and scope of an embodiment of the present invention should not be limited by any of the above-described exemplary embodiments, but should be defined only in accordance with the following claims and their equivalents.

What is claimed is:

1. A data storage system, comprising:
a ape channel for reading data from a magnetic tape medium to produce a signal;
a noise whitening filter positioned subsequent to the tape channel configured to receive the signal, wherein the noise whitening filter is configured to minimize variance of its output signal;
a soft detector configured to receive output from the noise whitening filter, the soft detector configured to calculate first soft information about each bit of the signal and sending the first soft information to a soft decoder; and
the soft decoder positioned subsequent to the soft detector, the soft decoder being configured to calculate second soft information about each bit of the signal and sending the second soft information to the soft detector;
wherein the soft detector applies a Dual-MAX (DMAX) algorithm, comprising:

$$\alpha_k(S_k) \cong \max_{S_{k-1}} \{\gamma_k(S_{k-1}, S_k) + \alpha_{k-1}(S_{k-1})\}$$

$$\beta_{k-1}(S_{k-1}) \cong \max_{S_k} \{\gamma_k(S_{k-1}, S_k) + \beta_k(S_k)\}$$

$$LLR(a_k) \cong \max_{\substack{S_{k-1} \rightarrow S_k \\ a_k = +1}} \{\alpha_{k-1}(S_{k-1}) + \gamma_k(S_{k-1}, S_k) + \beta_k(S_k)\} - \max_{\substack{S_{k-1} \rightarrow S_k \\ a_k = -1}} \{\alpha_{k-1}(S_{k-1}) + \gamma_k(S_{k-1}, S_k) + \beta_k(S_k)\},$$

wherein $y_k$ is the signal, $a_k$ denotes a bit in a bit sequence of the signal, $a_k(S_k)$ is an alpha term for a current state ($S_k$) in a forward recursion, $a_k(S_{k-1})$ is an alpha term for a previous state ($S_{k-1}$) in the forward recursion $\beta_k(S_k)$ is a beta term for the current state in a backward recursion, $\beta_{k-1}(S_{k-1})$ is a beta term for the previous state in the backward recursion, and $LLR(a_k)$ is an approximation of a log-likelihood term that calculates a posteriori probabilities.

2. The data storage system as recited in claim 1, wherein the magnetic tape medium is a linear tape open (LTO) format magnetic tape.

3. The data storage system as recited in claim 1, wherein the noise whitening filter processes the signal according to the following transfer polynomial: $W(D)=1-(p_1 D+ \ldots +p_\lambda D^\lambda)$, where $p_1 \ldots p_\lambda$ are noise whitening coefficients with the noise whitening filter having $2^\lambda$ states, where D is delay corresponding to bit duration and where the tape channel is characterized by a transfer function $F(D)=1+f_1 D+ \ldots +f_L D^L$ with the tape channel having $2^L$ states, wherein L represents a memory length of the tape channel, and wherein $\lambda$ represents a memory length of the noise whitening filter.

4. The data storage system as recited in claim 3, wherein the memory length of the tape channel and the memory length of the noise whitening filter are represented as a number of bits capable of storing a binary value of 0 or 1.

5. The data storage system as recited in claim 1, wherein the DMAX algorithm computes a branch metric, $mk(S_{k-1}, S_k)$, of a transition to a current state ($S_k$) from a previous state ($S_{k-1}$) represented by:

$$m_k(S_{k-1}, S_k) = -\frac{(z_k - w_k)^2}{2\sigma_p^2} + \ln P(a_k),$$

where $\sigma_p^2$ is prediction noise variance, $w_k$ is an ideal nominal signal output from the noise whitening filter, $P(a_k)$ denotes a priori probability of data bit $a_k$, and $z_k$ is an actual output of the noise whitening filter equaling $w_k+n_k$, where $n_k$ is noise affecting the signal.

6. The data storage system as recited in claim 5, wherein the DMAX algorithm is normalized according to the following relationship:

$$\alpha_k(S_k) = \max_{S_{k-1}} \{\alpha_{k-1}(S_{k-1}) + m_k(S_{k-1}, S_k)\}$$

$$(k = 1, \ldots, N)$$

Normalization find $A_k = \max_{S_k}\{\alpha_k(S_k)\}$, replace $\alpha_k(S_k) \to \alpha_k(S_k) - A_k \ \forall \ \alpha_k(S_k)$ $$\beta_{k-1}(S_{k-1}) = \max_{S_k}\{\beta_k(S_k) + m_k(S_{k-1}, S_k)\}$$

$$(k = N, \ldots, 2)$$

Normalization find $B_{k-1} = \max_{S_{k-1}}\{\beta_{k-1}(S_{k-1})\}$, replace $\beta_{k-1}(S_{k-1}) \to \beta_{k-1}(S_{k-1}) - B_{k-1} \ \forall \ \beta_{k-1}(S_{k-1})$, wherein $A_k$ denotes a maximum value for $a_k$ across all states ($S_k$), and wherein $a_k$ for each state ($S_k$) is replaced with a value equaling $a_k$ minus $A_k$ for normalization, and wherein $B_{k-1}$ denotes a maximum value for $\beta_{k-1}$ across all previous states ($S_{k-1}$), and wherein $\beta_k$ for each previous state ($S_{k-1}$) is replaced with a value equaling $\beta_{k-1}$ minus $\beta_{k-1}$ for normalization.

7. The data storage system as recited in claim 1, wherein the soft detector has a total of $2^{L+\lambda}$ states, where $2^{\lambda}$ is a number of states of the noise whitening filter, and $2^L$ is a number of states of the tape channel, wherein L represents a memory length of the tape channel, and wherein λ represents a memory length of the noise whitening filter.

8. The data storage system as recited in claim 1, wherein the noise whitening filter processes the signal according to the following transfer polynomial: $W(D)=1-(p_1D+ \ldots +p_\lambda D^\lambda)$, where $p_1 \ldots p_\lambda$ are noise whitening coefficients, where D is delay corresponding to bit duration and where the tape channel transfer polynomial is characterized by $F(D)=1+f_1D+ \ldots +f_L D^L$, with $2^{L+\lambda'}$ being a number of states of the tape channel, wherein the soft detector has a total of $2^{L+\lambda}$ states, the noise whitening filter comprises $2^{\lambda'}$ states, and λ' is greater than λ, wherein L represents a memory length of the tape channel, and wherein λ represents a memory length of the noise whitening filter.

9. The data storage system as recited in claim 8, wherein a branch metric, $m_k(S_{k-1}, S_k)$, of a transition to a current state ($S_k$) from a previous state ($S_{k-1}$) is represented as follows:

$$m_k(S_{k-1}, S_k) = -\frac{\{z_k - w_k(S_{k-1})\}^2}{2\sigma_p^2} + \ln P(a_k),$$

wherein $\sigma_p^2$ is prediction noise variance, $z_k$ is an actual output of the noise whitening filter, $P(a_k)$ denotes a priori probability of data bit $a_k$, $w_k$ is an ideal signal output from the noise whitening filter, and $w_k(S_{k-1})$ indicates that a bit pattern that defines $w_k$ also depends on a path memory associated with the previous state, $S_{k-1}$.

10. A method, comprising:
reading data from a magnetic tape medium using a tape channel to produce a signal;
passing the signal through a noise whitening filter to minimize variance of the signal output from the noise whitening filter;
passing the signal through a soft detector to calculate first soft information about each bit of the signal;
sending the first soft information to a soft decoder;
passing the signal through the soft decoder to calculate second soft information about each bit of the signal; and
sending the second soft information to the soft detector,
wherein the noise whitening filter is configured to process the signal according to the following transfer polynomial: $W(D)=1-(p_1D+ \ldots +p_\lambda D^\lambda)$, where $p_1 \ldots p_\lambda$ are noise whitening coefficients with the noise whitening filter having $2^\lambda$ states, where D is delay that corresponds to hit duration and where a transfer polynomial of the tape channel is $F(D)=1+f_1D+ \ldots +f_L D^L$ with the tape channel having $2^L$ states, wherein L represents a memory length of the tape channel, and wherein λ represents a memory length of the noise whitening filter.

11. The method as recited in claim 10, wherein the memory length of the tape channel and the memory length of the noise whitening filter are represented as a number of bits capable of storing a binary value of 0 or 1.

12. The method as recited in claim 11, wherein the soft detector applies a Dual-MAX (DMAX) algorithm, comprising:

$$\alpha_k(S_k) \cong \max_{S_{k-1}} \{\gamma_k(S_{k-1}, S_k) + \alpha_{k-1}(S_{k-1})\}$$

$$\beta_{k-1}(S_{k-1}) \cong \max_{S_k}\{\gamma_k(S_{k-1}, S_k) + \beta_k(S_k)\}$$

$$LLR(a_k) \cong \max_{\substack{S_{k-1} \to S_k \\ a_k=+1}} \{\alpha_{k-1}(S_{k-1}) + \gamma_k(S_{k-1}, S_k) + \beta_k(S_k)\} -$$

$$\max_{\substack{S_{k-1} \to S_k \\ a_k=-1}} \{\alpha_{k-1}(S_{k-1}) + \gamma_k(S_{k-1}, S_k) + \beta_k(S_k)\},$$

wherein $y_k$ is the signal, $a_k$ denotes a hit in a hit sequence of the signal, $a_k(S_k)$ is an alpha term for a current state ($S_k$) in a forward recursion, $a_k(S_{k-1})$ is an alpha term for a previous state ($S_{k-1}$) in the forward recursion $\beta_k(S_k)$ is a beta term for the current state in a backward recursion, $\beta_{k-1}(S_{k-1})$ is a beta term for the previous state in the backward recursion, and $LLR(a_k)$ is an approximation of a log-likelihood term that calculates a posteriori probabilities.

13. The method as recited in claim 12, wherein the DMAX algorithm computes a branch metric, $m_k(S_{k-1}, S_k)$, of a transition to a current state ($S_k$) from a previous state ($S_{k-1}$) reprresented by:

$$m_k(S_{k-1}, S_k) = -\frac{(z_k - w_k)^2}{2\sigma_p^2} + \ln P(a_k),$$

where $\sigma_p^2$ is prediction noise variance, $w_k$ is an ideal nominal signal output from the noise whitening filter, $P(a_k)$ denotes a priori probability of data hit $a_k$, and $z_k$ is an actual output of the noise whitening filter equaling $w_k+m_k$, where $n_k$ is noise affecting the signal.

14. The method as recited in claim 13, wherein the DMAX algorithm is normalized according to the following relationship:

$$\alpha_k(S_k) = \max_{S_{k-1}}\{\alpha_{k-1}(S_{k-1}) + m_k(S_{k-1}, S_k)\}$$

$(k = 1, \ldots, N)$

Normalization find $A_k = \max_{S_k}\{\alpha_k(S_k)\}$, replace $\alpha_k(S_k) \to \alpha_k(S_k) - A_k \; \forall \; \alpha_k(S_k)$ $$\beta_{k-1}(S_{k-1}) = \max_{S_k}\{\beta_k(S_k) + m_k(S_{k-1}, S_k)\}$$

$(k = N, \ldots, 2)$

Normalization find $B_{k-1} = \max_{S_{k-1}}\{\beta_{k-1}(S_{k-1})\}$, replace $\beta_{k-1}(S_{k-1}) \to \beta_{k-1}(S_{k-1}) - B_{k-1} \; \forall \; \beta_{k-1}(S_{k-1})$, wherein $A_k$ denotes a maximum value for $a_k$ across all states ($S_k$), and wherein $a_k$ for each state ($S_k$) is replaced with a value equaling $a_k$ minus $A_k$ for normalization, and wherein $B_{k-1}$ denotes a maximum value for $\beta_{k-1}$ across all previous states ($S_{k-1}$), and wherein $\beta_k$ for each previous state ($S_{k-1}$) is replaced with a value equaling $\beta_{k-1}$ minus $\beta_{k-1}$ for normalization.

15. The method as recited in claim 10, wherein the soft detector considers data dependent noise in calculating the first soft information about each bit of the signal, and wherein the soft detector has a total $2^{L+\lambda}$ states.

16. The method as recited in claim 10, wherein a branch metric, $m_k(S_{k-1}, S_k)$, of a transition to a current state ($S_k$) from a previous state ($S_{k-1}$) is represented as follows:

$$m_k(S_{k-1}, S_k) = -\frac{\{z_k - w_k(S_{k-1})\}^2}{2\sigma_p^2} + \ln P(a_k),$$

wherein $\sigma_p^2$ is prediction noise variance, $z_k$ is an actual output of the noise whitening filter, $P(a_k)$ denotes a priori probability of data bit $a_k$, $w_k$ is an ideal nominal signal output from the noise whitening filter, and $w_k(S_{k-1})$ indicates that a bit pattern that defines $w_k$ also depends on a path memory associated with the previous state, $S_{k-1}$.

17. A computer program product, comprising a computer readable storage medium having compute readable program code embodied therewith, the computer readable program code being readable/executable by a processor to cause the processor to:
   pass, by the processor, a signal through a noise whitening filter to minimize noise variance of the signal output from the noise whitening filter, the signal comprising data read from a magnetic tape medium;
   pass, by the processor, the signal through a soft detector to calculate first soft information about each bit of the signal; and
   send, by the processor, second soft information about each bit of the signal calculated in a soft decoder to the soft detector,
   wherein the soft detector applies a Dual-MAX (DMAX) algorithm, and
   wherein the noise whitening filter is configured to process the signal according to the following transfer polynomial: $W(D)=1-(p_1 D+\ldots+p_\lambda D^\lambda)$, where $p_1 \ldots p_\lambda$ are noise whitening coefficients, where D is delay corresponding to bit duration and where the tape channel transfer polynomial is characterized by $F(D)=1+f_1 D+\ldots+f_L D^L$, with $2^L$ being a number of states of the tape channel, wherein the soft detector has a total of $2^{L+\lambda}$ states, the noise whitening filter comprises $2^\lambda$ states, and $\lambda'$ is greater than $\lambda$, wherein L represents a memory length of the tape channel, and wherein $\lambda$ represents a memory length of the noise whitening filter.

18. The computer program product as recited in claim 17, wherein the DMAX algorithm comprises:

$$\alpha_k(S_k) \cong \max_{S_{k-1}}\{\gamma_k(S_{k-1}, S_k) + \alpha_{k-1}(S_{k-1})\}$$

$$\beta_{k-1}(S_{k-1}) \cong \max_{S_k}\{\gamma_k(S_{k-1}, S_k) + \beta_k(S_k)\}$$

$$LLR(a_k) \cong \max_{\substack{S_{k-1} \to S_k \\ a_k=+1}}\{\alpha_{k-1}(S_{k-1}) + \gamma_k(S_{k-1}, S_k) + \beta_k(S_k)\} - $$

$$\max_{\substack{S_{k-1} \to S_k \\ a_k=-1}}\{\alpha_{k-1}(S_{k-1}) + \gamma_k(S_{k-1}, S_k) + \beta_k(S_k)\},$$

wherein $y_k$ is the signal $a_k$ denotes a bit in a bit sequence of the signal, $a_k(S_k)$ is an alpha term for a current state ($S_{k-1}$) in a forward re $a_k(S_{k-1})$ is an alpha term for a previous state ($S_{k-1}$) in the forward recursion $\beta_k(S_k)$ is a beta term for the current state in a backward recursion, $\beta_{k-1}(S_{k-1})$ is a beta term for the previous state in the backward recursion, and $LLR(a_k)$ is an approximation of a log-likelihood term that calculates a posteriori probabilities.

19. The computer program product as recited in claim 18, wherein the DMAX algorithm computes a branch metric, $m_k(S_{k-1}, S_k)$, of a transition to a current state ($S_k$) from a previous state ($S_{k-1}$) represented by:

$$m_k(S_{k-1}, S_k) = -\frac{(z_k - w_k)^2}{2\sigma_p^2} + \ln P(a_k),$$

where $\sigma_p^2$ is prediction noise variance, $w_k$ is an ideal nominal signal output from the noise whitening filter, $P(a_k)$ denotes a priori probability of data bit $a_k$, and $z_k$ is an actual output of the noise whitening filter equaling $w_k+n_k$, where $n_k$ is noise affecting the signal.

20. The computer program product as recited in claim 18, wherein the DMAX algorithm is normalized according to the following relationship:

$$\alpha_k(S_k) = \max_{S_{k-1}}\{\alpha_{k-1}(S_{k-1}) + m_k(S_{k-1}, S_k)\}$$

$(k = 1, \ldots, N)$

Normalization find $A_k = \max_{S_k}\{\alpha_k(S_k)\}$, replace $\alpha_k(S_k) \to \alpha_k(S_k) - A_k \; \forall \; \alpha_k(S_k)$ $$\beta_{k-1}(S_{k-1}) = \max_{S_k}\{\beta_k(S_k) + m_k(S_{k-1}, S_k)\}$$

$(k = N, \ldots, 2)$

Normalization find $B_{k-1} = \max_{S_{k-1}}\{\beta_{k-1}(S_{k-1})\}$, replace $\beta_{k-1}(S_{k-1}) \to \beta_{k-1}(S_{k-1}) - B_{k-1} \; \forall \; \beta_{k-1}(S_{k-1})$ wherein $A_k$ denotes a maximum value for $a_k$ across all states ($S_k$), and wherein $a_k$ for each state ($S_k$) is replaced with a value equaling $a_k$ minus $A_k$ for normalization, and wherein $B_{k-1}$ denotes a maximum value for $\beta_{k-1}$ across all previous states ($S_{k-1}$), and wherein $\beta_k$ for each previous state ($S_{k-1}$) is replaced with a value equaling $\beta_{k-1}$ minus $\beta_{k-1}$ for normalization.

\* \* \* \* \*